(12) United States Patent
Toyoda

(10) Patent No.: US 11,557,122 B2
(45) Date of Patent: Jan. 17, 2023

(54) CONTROL APPARATUS, CONTROL SYSTEM, CONTROL METHOD, AND STORAGE MEDIUM

(71) Applicant: CANON KABUSHIKI KAISHA, Tokyo (JP)

(72) Inventor: Takuya Toyoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/063,406

(22) Filed: Oct. 5, 2020

(65) Prior Publication Data

US 2021/0103736 A1 Apr. 8, 2021

(30) Foreign Application Priority Data

Oct. 7, 2019 (JP) .............................. JP2019-184555

(51) Int. Cl.
*G06V 20/40* (2022.01)
*G06T 7/246* (2017.01)
*H04N 5/232* (2006.01)
*G06V 40/10* (2022.01)

(52) U.S. Cl.
CPC .............. *G06V 20/46* (2022.01); *G06T 7/246* (2017.01); *G06V 40/103* (2022.01); *H04N 5/23299* (2018.08)

(58) Field of Classification Search
CPC ............ G06K 9/00744; G06K 9/00369; G06T 7/246; H04N 5/23299
USPC ....................................................... 382/103
See application file for complete search history.

(56) References Cited

U.S. PATENT DOCUMENTS

2009/0324010 A1* 12/2009 Hou ........................ G06V 20/52
382/103
2015/0265920 A1* 9/2015 Kim ........................ A63F 13/577
463/31
2016/0147040 A1 5/2016 Watanabe et al.

FOREIGN PATENT DOCUMENTS

JP 2018072939 A * 5/2018

* cited by examiner

*Primary Examiner* — Wednel Cadeau
(74) *Attorney, Agent, or Firm* — Canon U.S.A., Inc. IP Division

(57) ABSTRACT

A control apparatus including an extraction unit configured to extract a subject from an image captured by an image capturing apparatus, an estimation unit configured to estimate a skeleton of the subject extracted by the extraction unit and a control unit configured to control an angle of view of the image capturing apparatus based on a result of the estimation by the estimation unit.

17 Claims, 20 Drawing Sheets

CONTROL APPARATUS, CONTROL SYSTEM, CONTROL METHOD, AND STORAGE MEDIUM

BACKGROUND OF THE INVENTION

Field of the Invention

The present disclosure relates to a control apparatus, a control system, a control method, and a storage medium.

Description of the Related Art

In recent years, there is a growing need for a system capable of automatically image capturing a scene in which some motion occurs, such as a sports scene, by using an image capturing apparatus that is remotely controllable. As a technique for achieving such an automatic image capturing operation, a pan/tilt/zoom control operation for the image capturing apparatus is performed in response to a motion of a subject to adjust an angle of view of the image capturing apparatus, whereby the subject can be captured within the angle of view. Japanese Patent Application Laid-Open No. 2018-19410 discusses a technique in which the motion amount of a subject is calculated and a magnification ratio for zoom control of an image capturing apparatus is controlled based on the calculation result of the amount of motion, and therefore even when the subject has fell outside the angle of view, the subject can be immediately captured again within the angle of view.

Meanwhile, a control operation for controlling the angle of view of the image capturing apparatus in accordance with a detection result of a motion of the subject may cause a delay in the process from detection of the motion of the subject to the control operation for controlling the angle of view, which may make it difficult to capture the subject within the angle of view. In particular, when a motion of a subject varies with time, like in a sports scene, the effect of the above-described delay may become more significant.

SUMMARY OF THE INVENTION

To enable a subject to be captured within an angle of view in a suitable mode even when a motion of a subject varies, for example, the following configuration is provided.

According to an aspect of the present disclosure, a control apparatus includes an extraction unit configured to extract a subject from an image captured by an image capturing apparatus, an estimation unit configured to estimate a skeleton of the subject extracted by the extraction unit and a control unit configured to control an angle of view of the image capturing apparatus based on a result of the estimation by the estimation unit.

Further features of the present disclosure will become apparent from the following description of exemplary embodiments with reference to the attached drawings.

DESCRIPTION OF THE EMBODIMENTS

Figure 1:
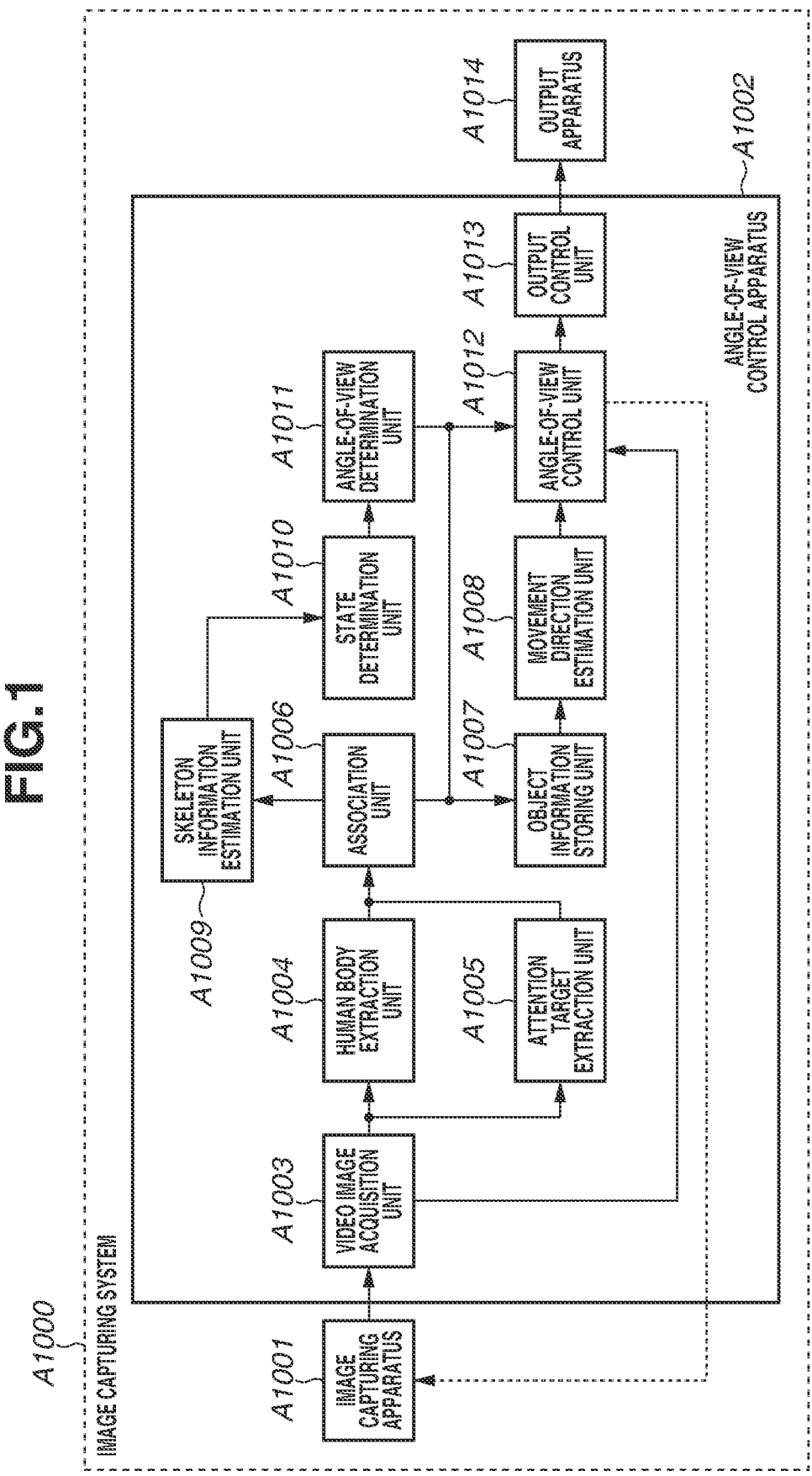
FIG. 1 is a block diagram illustrating an example of functional configuration of an image capturing system.

Preferred exemplary embodiments of the present disclosure will be described in detail below with reference to the accompanying drawings. In the specification and drawings, constituent elements including substantially the same functional configuration are denoted by the same reference numerals, and redundant descriptions thereof are omitted.

An image capturing system according to a first exemplary embodiment of the present disclosure will be described below. The image capturing system according to the present exemplary embodiment is mainly directed to enabling a subject to be captured within an angle of view in a more suitable mode even when a motion of a subject, such as a player or a ball used for a game, for example, in a sports scene, varies with time.

Specifically, a subsequent movement of a ball or the like in a sports scene greatly varies in accordance with how each human body moves. In such a scene, when the moving speed of the ball is rapidly increased, like in a case where a player has shot a ball in a soccer game, the ball can fall outside the angle of view. In addition, a ball in a sports scene does not autonomously move, but movement of the ball may vary in accordance with the motion of a human body involved in the movement of the ball (e.g., a player who operates the ball).

In view of the above-described features, the image capturing system according to the present exemplary embodiment estimates a motion of a human body by using skeleton information about the human body, and by using the estimation result in controlling the angle of view of the image capturing apparatus, a subject, such as a ball, which is set as an attention target, is captured within the angle of view of the image capturing apparatus.

The following exemplary embodiment takes as an example a case where the angle of view of the image capturing apparatus is controlled by focusing on movement of a ball in a soccer game, for the convenience of the explanation of features of the image capturing system according to the present exemplary embodiment, and features of the image capturing system according to the present exemplary embodiment will be described in detail below. In the image capturing system according to the present exemplary embodiment and image capturing systems according to second and third exemplary embodiments to be described below, in particular, a portion associated with a control operation for controlling the angle of view of the image capturing apparatus corresponds to an example of a control system.

(Functional Configuration)

An example of a functional configuration of an image capturing system A1000 according to a first present exemplary embodiment will be described with reference to FIG. 1. The image capturing system A1000 is a system that recognizes each human body and a ball from an image obtained by image capturing a field of a soccer stadium, adjusts the angle of view of the image capturing apparatus to capture the ball within the angle of view of the image capturing apparatus, and causes an output apparatus, such as a display, to output an image based on an image capturing result.

The image capturing system A1000 includes an image capturing apparatus A1001, an angle-of-view control apparatus A1002, and an output apparatus A1014. The image capturing apparatus A1001 and the angle-of-view control apparatus A1002 are connected with each other via, for example, a video interface. With this configuration, image data based on a result of image capturing by the image capturing apparatus A1001 can be transferred to the angle-of-view control apparatus A1002. The interface for connecting between the image capturing apparatus A1001 and the angle-of-view control apparatus A1002 is not particularly limited as long as the image data based on the result of image capturing by the image capturing apparatus A1001 can be transferred to the angle-of-view control apparatus A1002.

The image capturing apparatus A1001 captures an image of a surrounding environment and generates data (hereinafter also referred to as "image data") on images, such as a still image and a moving image, based on the image capturing result. The term "image" used singly in the following description may include a still image and a moving image, unless otherwise noted. The image capturing apparatus A1001 outputs the image data based on the image capturing result to the angle-of-view control apparatus A1002. By sequentially outputting the image data based on the image capturing result from the image capturing apparatus A1001 to the angle-of-view control apparatus A1002 in real time, accuracy of an angle-of-view control operation that is performed by the angle-of-view control apparatus A1002 can be improved as described below.

The output apparatus A1014 is implemented by, for example, a display apparatus such as a display, and displays desired information on a screen or the like, to present the information to a user.

The angle-of-view control apparatus A1002 acquires the image data based on the image capturing result from the image capturing apparatus A1001, and extracts, from the image indicated by the image data, a subject (ball) set as an attention target and each human body set as another subject that is different from the subject. The angle-of-view control apparatus A1002 estimates a motion of the human body by estimating skeleton information about the human body extracted from the image, and estimates a subsequent movement of the ball, which is set as the attention target, by using the estimation result of the human body. The angle-of-view control apparatus A1002 controls the angle of view of the image capturing apparatus A1001 based on the estimation result of the motion of the ball. In the present exemplary embodiment, the ball set as the attention target corresponds to an example of a "first subject", and the human body whose motion is to be estimated based on skeleton information corresponds to an example of a "second subject".

Examples of the angle-of-view control operation include pan control and tilt control for controlling a direction of an angle of view (image capturing direction) by adjusting the image capturing direction horizontally and vertically, and zoom control for controlling a magnification ratio for image capturing. The angle-of-view control method is not particularly limited as long as the above-described angle-of-view control operation can be achieved.

For example, the angle-of-view control apparatus A1002 may control the angle of view by digital processing such as image processing. In this case, the angle-of-view control apparatus A1002 may clip a part of the image based on the result of image capturing by the image capturing apparatus A1001, and may enlarge a part of the image (hereinafter also referred to as a "partial image") clipped by digital zoom processing, as needed.

In another example, the angle-of-view control apparatus A1002 may optically control the angle of view by performing a control operation (pan control and tilt control) for controlling the direction of the image capturing apparatus A1001 and a control operation (zoom control) for controlling the magnification ratio for image capturing by the image capturing apparatus A1001.

The angle-of-view control apparatus A1002 causes the output apparatus A1014 to display the image obtained after the angle of view is controlled.

Each functional configuration of the angle-of-view control apparatus A1002 will now be described in detail below. The angle-of-view control apparatus A1002 includes a video image acquisition unit A1003, a human body extraction unit A1004, an attention target extraction unit A1005, an association unit A1006, and an object information storing unit A1007. The angle-of-view control apparatus A1002 also includes a movement direction estimation unit A1008, a skeleton information estimation unit A1009, a state determination unit A1010, an angle-of-view determination unit A1011, an angle-of-view control unit A1012, and an output control unit A1013.

The video image acquisition unit A1003 acquires image data corresponding to the image capturing result from the image capturing apparatus A1001. The video image acquisition unit A1003 outputs the acquired image data to each of the human body extraction unit A1004, the attention target extraction unit A1005, and the angle-of-view control unit A1012.

The human body extraction unit A1004 acquires the image data from the video image acquisition unit A1003 and performs image processing on the image indicated by the image data, to extract each human body captured in the image. The human body extraction method is not particularly limited as long as a human body captured in an image can be extracted from the image. As a specific example, a human body captured in an image can be extracted using a template matching method, a semantic segmentation method, or the like. The template matching method and the semantic segmentation method are known techniques, and thus detailed descriptions thereof are omitted.

The human body extraction unit A1004 outputs, to the association unit A1006, information (e.g., coordinates representing a position of an area where a human body is captured in an image) based on the extraction result of each human body from the image.

The attention target extraction unit A1005 acquires the image data from the video image acquisition unit A1003, and performs image processing on the image indicated by the image data, to extract a subject set as an attention target among the subjects captured in the image. In the present exemplary embodiment, a ball is set as an attention target and the attention target extraction unit A1005 extracts the ball from the image. The extraction method is not particularly limited as long as a desired subject (e.g., a ball) captured in an image can be extracted from the image. As a specific example, a desired subject captured in an image can be extracted using the template matching method, the semantic segmentation method, or the like.

The attention target extraction unit A1005 outputs information (e.g., coordinates representing the position of the area where the ball is captured in the image) based on the extraction result of the ball from the image to the association unit A1006.

The association unit A1006 acquires information based on the extraction result of the human body in the image from the human body extraction unit A1004. Further, the association unit A1006 acquires information based on the extraction result of the ball (i.e., the subject set as the attention target) from the image described above. The association unit A1006 associates the ball extracted from the image with the human body extracted from the image.

Figure 2:
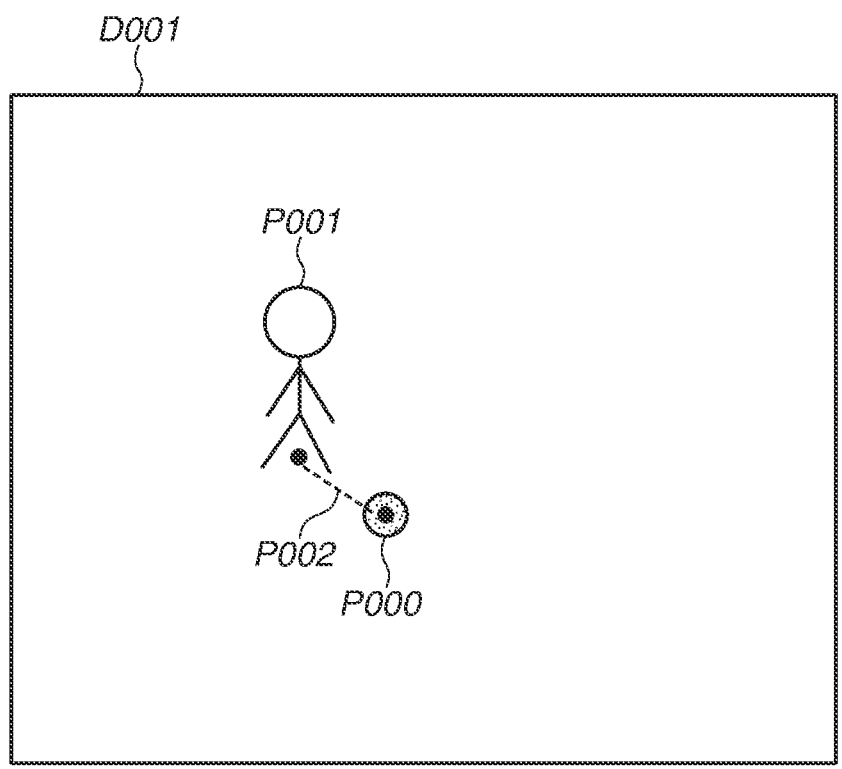
FIG. 2 is a diagram illustrating an example of processing for associating a human body with a ball.
Figure 3:
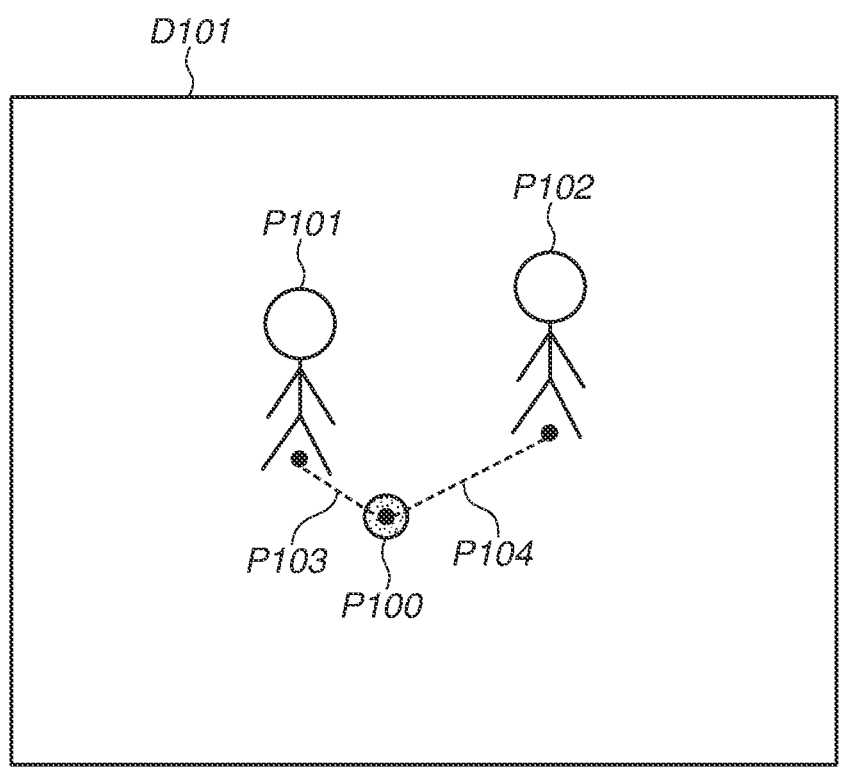
FIG. 3 is a diagram illustrating an example of processing for associating each human body with a ball.

An example of a method for associating a human body with a ball based on the extraction result of each of the human body and the ball from an image will now be described with reference to FIGS. 2 and 3.

First, FIG. 2 will be described. An image D001 is an image indicated by image data acquired by the angle-of-view control apparatus A1002 from the image capturing apparatus A1001, that is, an image based on the result of image capturing by the image capturing apparatus A1001. The image D001 includes a ball P000 and a human body P001. A distance P002 is a distance between the ball P000 and the human body P001. For example, the association unit A1006 calculates, as the distance P002, a distance between a centroid position between both legs of the human body P001 and a centroid position of the ball P000 in a real space.

As a method for calculating the distance in the real space based on the distance in the image, a known method can be applied. As a specific example, a distance between a plurality of subjects in the real space can be calculated based on a distance between coordinates of the plurality of subjects in an image and a magnification ratio for capturing the image. In this case, the relationship between the position of an image capturing target area and the position of an image capturing apparatus that captures an image and the relationship between the orientation of the area and the orientation of the image capturing apparatus may be taken into consideration for calculation of the distance between the plurality of subjects. Specifically, the distance between the position of each image capturing area and the image capturing apparatus may vary. In this case, the distance between each subject and the image capturing apparatus is estimated based on the position where each of the plurality of subjects is present in the area, and the distance between the plurality of subjects can be calculated factoring in the estimation result of the distance.

When one human body and one ball are present in the image, the association unit A1006 associates the human body with the ball in a case where the distance P002 between the ball P000 and the human body P001 is less than or equal to a threshold. In the present exemplary embodiment, the association unit A1006 associates the human body P001 with the ball P000 in a case where the distance P002 between the ball P000 and the human body P001 is less than or equal to 0.3 m. However, the function of the association unit A1006 is not necessarily limited. In other words, the threshold used for determination of the distance P002 may be changed, as needed, in accordance with the use case or environment in which the image capturing system A1000 is assumed to be applied.

Next, FIG. 3 will be described. An image D101 is indicated by image data acquired by the angle-of-view control apparatus A1002 from the image capturing apparatus A1001, that is, an image based on the result of image capturing by the image capturing apparatus A1001. The image D101 includes a ball P100 captured in the image D101. Human bodies P101 and P102 are also captured in the image D101. A distance P103 represents a distance between the ball P100 and the human body P101. Similarly, a distance P104 represents a distance between the ball P100 and the human body P102. As a method for calculating the distance P103 and the distance P104, a method substantially the same as the method of calculating the distance P002 in the example illustrated in FIG. 2 can be applied, and thus the detailed description thereof is omitted.

In a case where a plurality of human bodies are at a distance of less than or equal to the threshold from the ball is in the image, the association unit A1006 may associate, for example, the ball with a human body at the shortest distance away from the ball. For example, in the example illustrated in FIG. 3, the distance P103 is shorter than the distance P104. In other words, the human body P101 is at a position closer to the ball P100 than the human body P102. Accordingly, in this case, the association unit A1006 associates the human body P101 with the ball P100.

Then, the association unit A1006 outputs information based on the result of associating the ball and the human body extracted from the image to each of the object information storing unit A1007 and the skeleton information estimation unit A1009. In the present exemplary embodiment, the association unit A1006 outputs, as the information based on the result of associating the ball with the human body, coordinate information in the image of the human body associated with the ball to each of the object information storing unit A1007 and the skeleton information estimation unit A1009.

The object information storing unit A1007 acquires coordinate information in the image of the human body associated with the ball from the association unit A1006, and stores the acquired coordinate information. In this processing, the object information storing unit A1007 may store the acquired coordinate information individually for each frame in which the image from which the coordinate information is derived is captured. In the following description, coordinate information in the image of the human body associated with the ball is also referred to simply as "human body coordinate information".

The object information storing unit A1007 outputs coordinate information about the human body acquired in each of a plurality of different frames to the movement direction estimation unit A1008. In the present exemplary embodiment, the object information storing unit A1007 outputs the human body coordinate information corresponding to each of a latest frame (e.g., a current frame) and an immediately preceding frame of the latest frame to the movement direction estimation unit A1008.

The movement direction estimation unit A1008 acquires the coordinate information about the human body acquired from each of the plurality of different frames from the object information storing unit A1007. The movement direction estimation unit A1008 calculates a movement vector of the human body based on the coordinate information about the human body acquired for each of the plurality of frames, and estimates a movement direction of the human body between the plurality of frames based on the calculation result of the movement vector. Since, for example, the movement vector for the human body is calculated for each of the latest frame and the immediately preceding frame of the latest frame, the movement direction of the human body in the latest frame can be estimated based on the movement vector.

Then, the movement direction estimation unit A1008 outputs information based on the estimation result of the movement direction of the human body to the angle-of-view control unit A1012.

The skeleton information estimation unit A1009 acquires coordinate information about the human body from the association unit A1006 and estimates skeleton information about the human body based on the coordinate information about the human body.

In recent years, various skeleton estimation techniques to which machine learning, as typified by deep learning, is applied have been proposed as techniques for estimating skeleton information about a human body captured in an image. Some of the skeleton estimation techniques provide Open Source Software (OSS), such as OpenPose and Deep-Pose, and using the OSS facilitates the skeleton estimation. In the present exemplary embodiment, the skeleton estimation technique to which machine learning is applied is used for estimation of skeleton information about a human body. However, the skeleton estimation method is not particularly limited as long as skeleton information about a human body can be estimated.

The skeleton information estimation unit A1009 clips a partial image corresponding to an area indicated by coordinate information about the human body from the image indicated by the image data acquired from the image capturing apparatus A1001, and estimates skeleton information about the human body by applying the skeleton estimation technique to the partial image. Then, the skeleton information estimation unit A1009 outputs the estimation result of the skeleton information about the human body to the state determination unit A1010.

The state determination unit A1010 acquires the estimation result of the skeleton information about the human body from the state determination unit A1010, and determines the state of each of the human body and the ball based on the estimation result of the skeleton information about the human body. Specifically, for example, the state determination unit A1010 may analyze information, such as the height of the centroid position of the human body, the tilt of the orientation of the human body, and the angle of a specific region of the human body based on the skeleton information about the human body, and may determine the state of each of the human body and the ball based on the analysis result.

An example of the method of determining the state of each human body and a ball based on the skeleton information about the human body will be described with reference to FIGS. 4 to 7.

Figure 4:
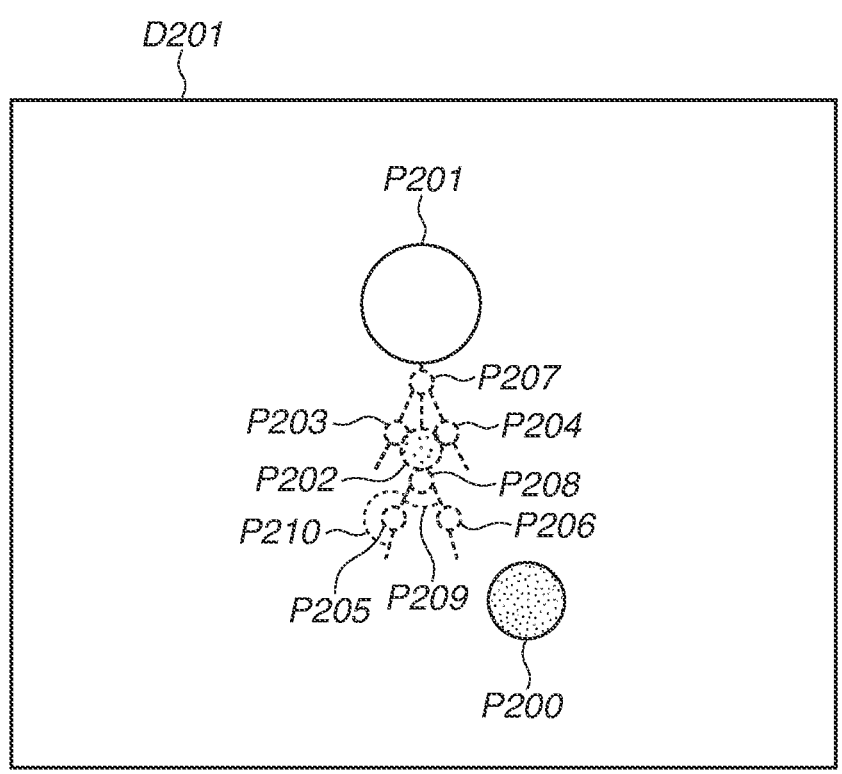
FIG. 4 is a diagram illustrating an example of a method for determining a state of a human body and a ball based on skeleton information.

First, FIG. 4 will be described. FIG. 4 illustrates an estimation result of skeleton information about a human body based on a captured image of the human body and an example of information obtained based on the estimation result. An image D201 is an example image used for estimation of skeleton information about a human body. The image D201 includes a ball P200 and a human body P201. A centroid position P202 of the human body P201 is also included. A right elbow joint P203, a left elbow joint P204, a right knee joint P205, a left knee joint P206, a neck joint P207, and a waist joint P208 of the human body P201 are yet further included. An angle P209 represents an angle formed between both legs of the human body P201. An angle-of-leg P210 represents a leg angle of when the human body P210 lifts the leg.

Figure 5:
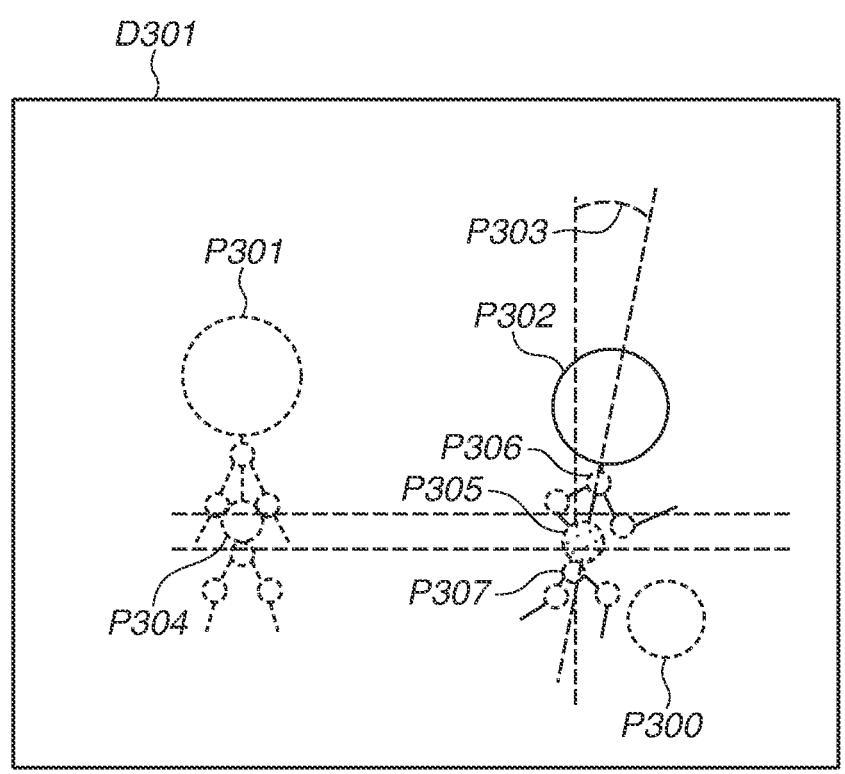
FIG. 5 is a diagram illustrating an example of a method for determining a state of human bodies and a ball based on skeleton information.

Next, FIG. 5 will be described. FIG. 5 is an explanatory diagram illustrating an example of a method of determining whether a human body is running. An image D301 is used as an example image for estimation of skeleton information about a human body. The image D301 includes a ball P300. A human body P301 is in an erect state. Meanwhile, a human body P302 is in a running state. A neck joint P306 and a waist joint P307 of the human body P302 are also included. A tilt P303 indicates a tilt of a straight line passing through the neck joint P306 and the waist joint P307 with respect to a vertical direction. In other words, the tilt P303 represents the tilt of the orientation of the human body P302. A centroid position P304 is a centroid position of the human body P301 in the erect state. Meanwhile, a centroid position P305 is a centroid position of the human body P302 in the running state.

The human body in the running state tends to have a lower centroid position than the human body in the erect state, and the human body in the running state tends to be tilted more than the human body in the erect state. Accordingly, when the centroid position of the human body is lower than the centroid position of the human body in the erect state and the orientation of the human body is tilted more than the human body in the erect state, it can be determined that the human body is in the running state.

Figure 6:
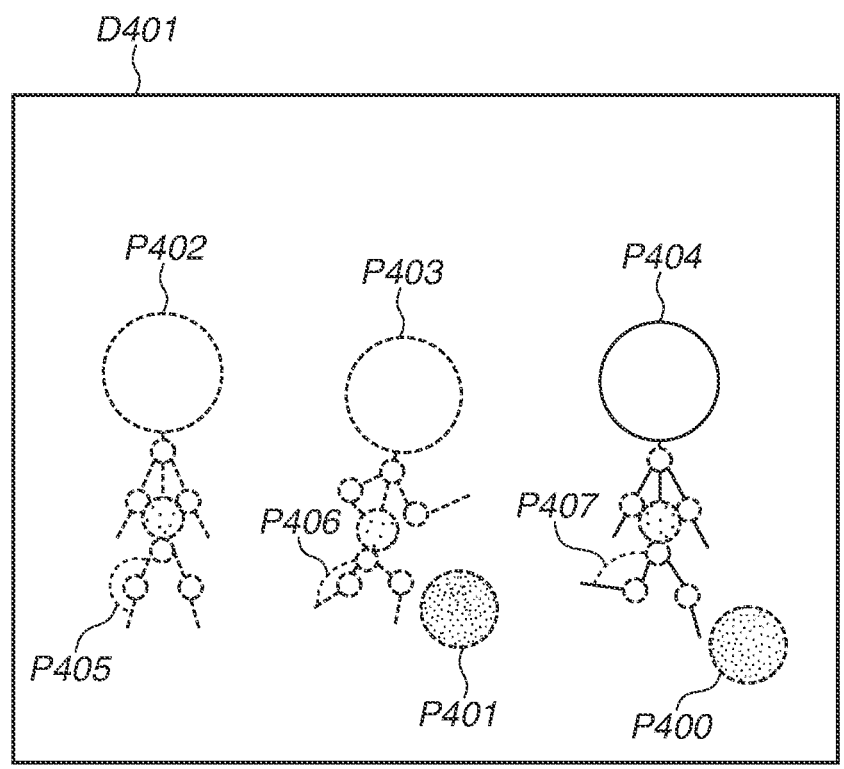
FIG. 6 is a diagram illustrating an example of a method for determining a state of human bodies and balls based on skeleton information.

Next, FIG. 6 will be described. FIG. 6 is an explanatory diagram illustrating an example of the method of determining that a human body kicks a ball. An image D401 is an example image used for estimation of skeleton information about a human body. The image D401 includes balls P400 and P401. A human body P402 is in an erect state. A human body P403 is in a running state. Meanwhile, a human body P404 is in a state where the human body kicks a ball. An angle P405 formed at a leg of the human body P402 in the erect state. An angle P406 of the leg of the human body P403 represents the running state. Meanwhile, an angle P407 is an angle of a leg of the human body P404 in the state where the human body P404 kicks the ball.

As is obvious from the comparison among the leg angles P405, P406, and P407, the leg angle P407 obtained when the human body kicks the ball tends to be small than that the leg angle P405 of the human body in the erect state and the leg angle P406 of the human body in the running state. Accordingly, when the leg angle of the human body is smaller than that of the human body in the erect state or in the running state, it can be determined that the human body kicks the ball.

Figure 7:
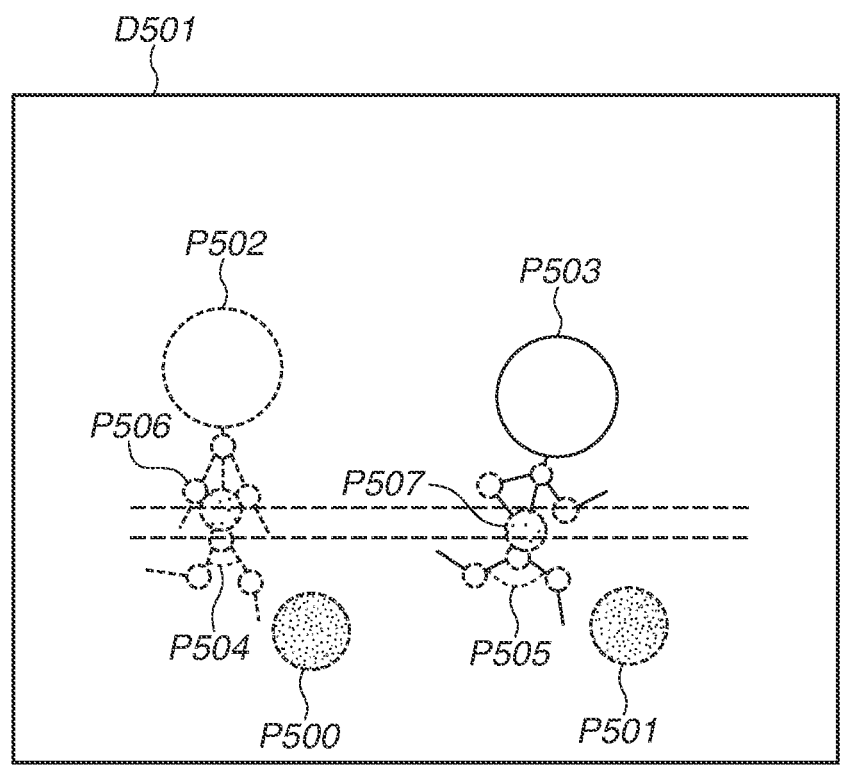
FIG. 7 is a diagram illustrating an example of a method for determining a state of human bodies and balls based on skeleton information.

Next, FIG. 7 will be described. FIG. 7 is an explanatory diagram illustrating an example of the method for determining magnitude of a ball kicking force by a human body. An image D501 is an example image used for estimation of skeleton information about a human body. The image D501 includes balls P500 and P501. A human body P502 is in a state where the human body kicks a ball with a weak force. Meanwhile, a human body P503 is in a state where the human body kicks a ball with a strong force. An angle P504 represents an angle formed between both legs of the human body P502 in the state where the human body kicks a ball with a weak force. Meanwhile, an angle P505 is an angle formed between both legs of the human body P503 in the state where the human body kicks a ball with a strong force. A centroid position P506 of the human body P502 is a centroid position in the state where the human body kicks the ball with a weak force. On the other hand, a centroid position P507 is a centroid positon of the human body P503 in the state where the human body kicks the ball with a strong force.

As is obvious from the comparison between the centroid positions P506 and P507 and the comparison between the angles P504 and P505, when the human body kicks a ball with a strong force, the centroid position of the human body tends to be lower than that of when the human body kicks the ball with a weak force and the angle formed between the both legs of the human body tends to be larger than that of when the human body kicks the ball with a weak force. Therefore, when the centroid position of the human body is lower than that of when the human body kicks the ball with a weak force and the angle formed between the both legs of the human body is larger than that of when the human body kicks the ball with a weak force, it can be determined that the human body kicks the ball with a strong force. The application of the above-described determination method to the determination of the state of each human body in a soccer game makes it possible to determine whether the human body plays a short pass, or whether the human body shoots a ball or plays a long pass.

In addition, the discrimination between the case where the human body kicks the ball with a weak force and the case where the human body kicks the ball with a strong force makes it possible to estimate a subsequent movement amount of the ball. Specifically, in the case where the human body kicks the ball with a strong force, the movement amount of the ball increases, and in the case where the human body kicks the ball with a weak force, the movement amount of the ball decreases. The use of such characteristics enables the state determination unit A1010 to determine the movement amount of the ball, for example, at three levels, i.e., "small", "large", and "considerably large".

As described above, the state determination unit A1010 determines the state of the human body and the ball based on the estimation result of skeleton information about the human body, and outputs information based on the determination result to the angle-of-view determination unit A1011. As a specific example, the state determination unit A1010 outputs, as the information based on the determination result of the state of each of the human body and the ball, the estimation result of the movement amount of the ball to the angle-of-view determination unit A1011.

The angle-of-view determination unit A1011 acquires information based on the determination result of the state of each of the human body and the ball from the state determination unit A1010, and determines a control method and a control amount for controlling the angle of view for image capturing based on the information. As a specific example, the angle-of-view determination unit A1011 may determine a magnification ratio for image capturing (i.e., a magnification ratio to be used for zoom control) based on the estimation result of the movement amount of the ball. In this case, the angle-of-view determination unit A1011 may calculate the magnification ratio by, for example, applying the estimation result of the movement amount of the ball to a predetermined conditional expression. In another example, the angle-of-view determination unit A1011 may select a candidate to be applied from among candidates for a preliminarily set magnification ratio, based on the estimation result of the movement amount of the ball.

Further, the angle-of-view determination unit A1011 outputs information based on the determination result of the control method and control amount for controlling the angle of view to the angle-of-view control unit A1012. As a specific example, the angle-of-view determination unit A1011 outputs information about the magnification ratio for image capturing determined based on the estimation result of the movement amount of the ball to the angle-of-view control unit A1012.

The angle-of-view control unit A1012 acquires image data based on the result of image capturing by the image capturing apparatus A1001 from the video image acquisition unit A1003. The angle-of-view control unit A1012 acquires information based on the estimation result of the movement direction of the human body from the movement direction estimation unit A1008. Further, the angle-of-view control unit A1012 acquires information (e.g., information about the magnification ratio for image capturing) based on the determination result of the control method and control amount for controlling the angle of view from the angle-of-view determination unit A1011. The angle-of-view control unit A1012 controls the angle of view based on the information based on the estimation result of the movement direction of the human body and the information based on the determination result of the control method and control amount for controlling the angle of view.

As a specific example, in a case where the angle-of-view control unit A1012 acquires information about the magnification ratio for image capturing from the angle-of-view determination unit A1011, the angle-of-view control unit A1012 may perform a zoom control operation based on the magnification ratio.

Further, the angle-of-view control unit A1012 may perform a control operation for controlling the direction of the angle of view (image capturing direction), such as pan control and tilt control, based on the information based on the estimation result of the movement direction of the human body acquired from the movement direction estimation unit A1008. In a case where the movement direction estimation unit A1008 has not detected any movement of the human body, the angle-of-view control unit A1012 need not perform the control operation for controlling the direction of the angle of view, or may continuously perform the control operation for controlling the direction of the angle of view based on the information acquired from the movement direction estimation unit A1008 during the previous detection. In a case where the information based on the estimation result of the movement direction of the human body is not output from the movement direction estimation unit A1008, the angle-of-view control unit A1012 may continuously perform the control operation for controlling the direction of the angle of view based on the information previously acquired from the movement direction estimation unit A1008.

An example of the angle-of-view control operation will now be described in more detail with reference to FIGS. 8 to 10.

First, FIG. 8 will be described. An image D601 is an image based on a result of image capturing by the image capturing apparatus A1001. The image D601 includes a ball P600 and a human body P601. In a case where the state determination unit A1010 determines that the human body P601 kicks the ball P600 with a strong force, the angle-of-view control unit A1012 performs a zoom control operation to avoid the ball P600 moving out from the angle of view.

Figure 8:
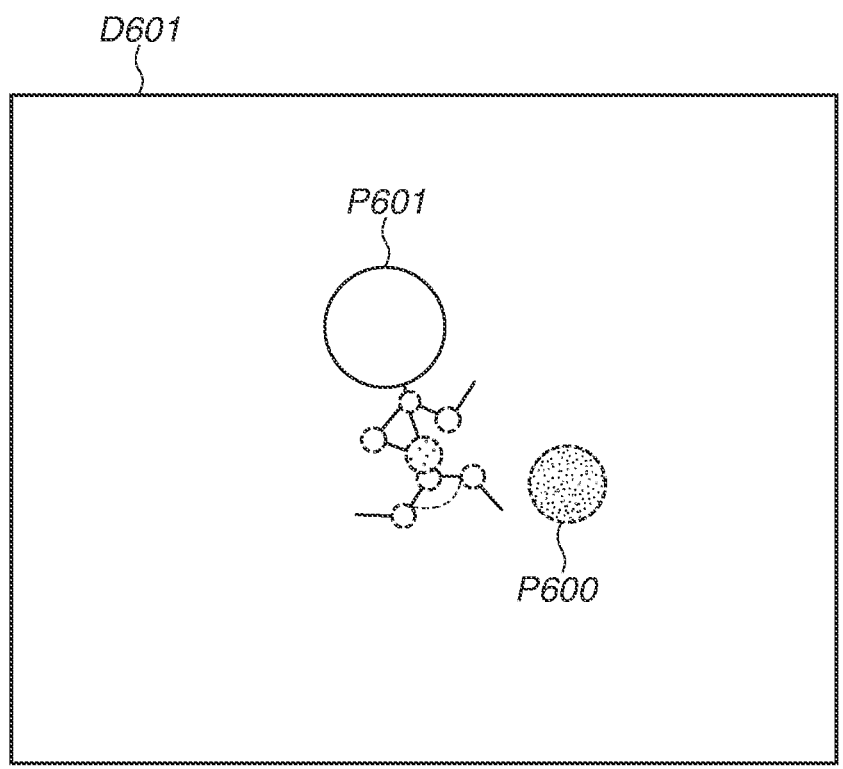
FIG. 8 is a diagram illustrating an example of an angle-of-view control operation.
Figure 9:
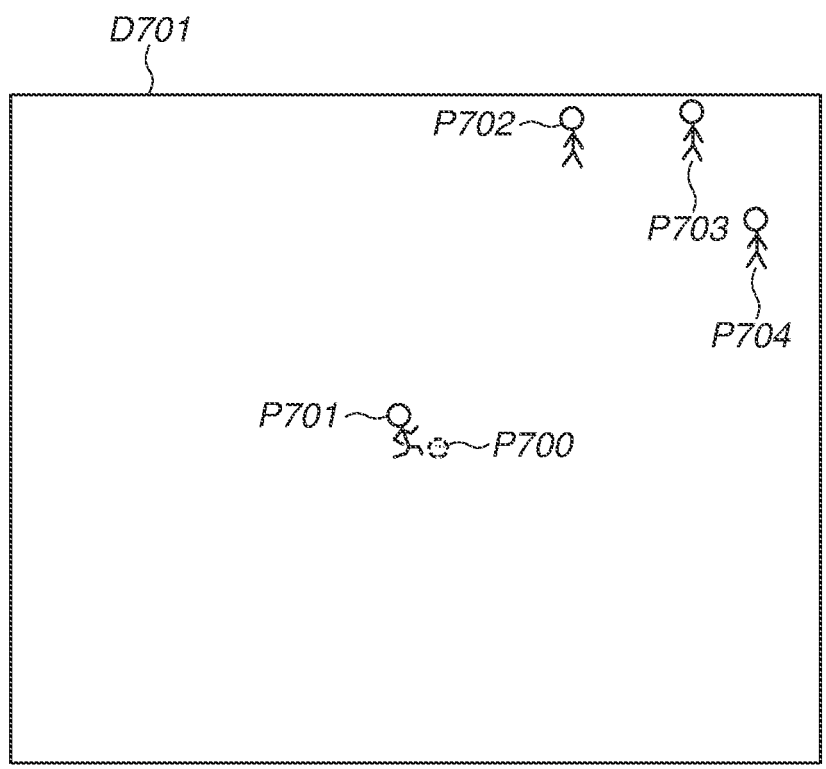
FIG. 9 is a diagram illustrating an example of an angle-of-view control operation.

FIG. 9 illustrates an example of the result of application of the zoom control operation to the image D601 illustrated in FIG. 8 in a case where the state determination unit A1010 has determined that the human body P601 kicks the ball P600 with a strong force. An image D701 is an image obtained after the zoom control operation is applied to the image D601 illustrated in FIG. 8. The image D701 includes a ball P700. The ball P700 corresponds to the ball P600 illustrated in FIG. 8. Human bodies P701 to P704 are also included. In particular, the human body P701 corresponds to the human body P601 illustrated in FIG. 8.

In the example illustrated in FIG. 9, since the state determination unit A1010 has determined that the human body kicks the ball with a strong force, the zoom control operation (zoom-out control) is performed to capture a wider area within the angle of view as compared with the image D601 illustrated in FIG. 8.

Figure 10:
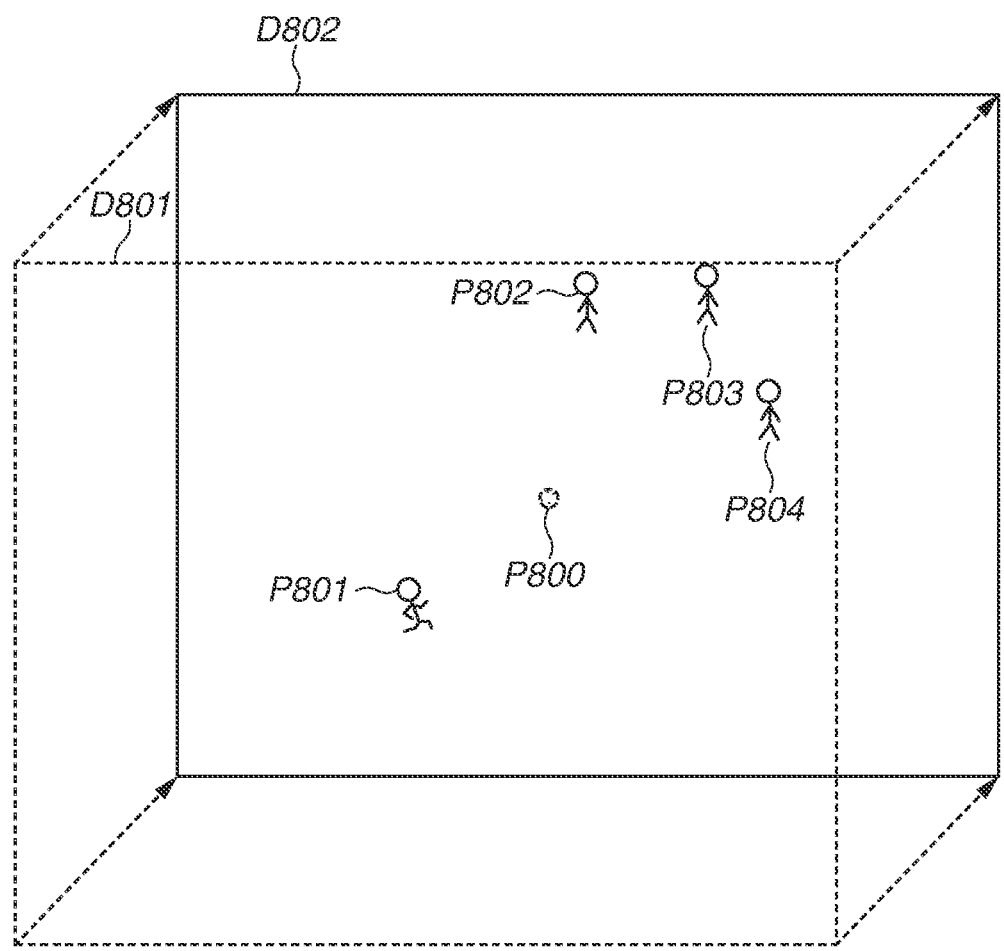
FIG. 10 is a diagram illustrating an example of an angle-of-view control operation.

FIG. 10 illustrates an example of the result of application of the control operation (e.g., pan control and tilt control) for controlling the direction of the angle of view based on the estimation result of the movement direction of each human body by the movement direction estimation unit A1008 in the image D701 illustrated in FIG. 9. An image D801 is obtained before the control operation for controlling the direction of the angle of view is applied. The image D801 corresponds to the image D701 illustrated in FIG. 9. An image D802 is obtained after the control operation for controlling the direction of the angle of view is applied to the image D801. A ball P800 corresponds to the ball P700 illustrated in FIG. 9. Human bodies P801 to P04 correspond to the human bodies P701 to P704 illustrated in FIG. 9.

In the example illustrated in FIG. 10, the state determination unit A1010 has estimated that the ball P800 is moved in an upper right direction on the drawing sheet based on the estimation result of the movement direction of each human body, and the direction of the angle of view is controlled to move in the upper right direction on the drawing sheet based on the movement direction of the ball P800. With this configuration, the direction of the angle of view can be controlled to follow the movement of the ball P800, and the ball P800 can be continuously captured within the angle of view.

As described above, the angle-of-view control unit A1012 controls the angle of view and outputs the image data indicating the image obtained after the angle of view is controlled to the output control unit A1013.

In the case of controlling the angle of view by digital processing, the angle-of-view control unit A1012 clips a partial image corresponding to the controlled angle of view from the image indicated by the image data acquired from the video image acquisition unit A1003, and outputs image data indicating the partial image to the output control unit A1013.

Meanwhile, as described above, the angle-of-view control unit A1012 may control the angle of view by performing the control operation (pan control and tilt control) for controlling the direction of the image capturing apparatus A1001, and the control operation (zoom control) for controlling the magnification ratio for image capturing by the image capturing apparatus A1001. In this case, the angle-of-view control unit A1012 may acquire image data indicating the image based on the result of image capturing by the image capturing apparatus A1001 performed after the angle of view has been controlled, from the video image acquisition unit A1003, and may output the image data to the output control unit A1013.

The output control unit A1013 acquires the image data from the angle-of-view control unit A1012 and outputs the image indicated by the image data to the output apparatus A1014.

The output apparatus A1014 displays the image based on the image data on the screen according to an instruction from the output control unit A1013, to present the image to the user.

While the exemplary embodiment described above illustrates an example where the movement amount of the ball is estimated based on the estimation result of skeleton information about each human body, the subject and method for determination of the state of each of the human body and the ball based on skeleton information about the human body are not necessarily limited to those described in the exemplary embodiment. Specifically, the estimation result or determination result of an event can be used for controlling the angle of view, as long as the event can be estimated or determined based on skeleton information about the human body.

As a specific example, in a case where it is determined that the human body kicks the ball, the direction in which the human body kicks the ball (i.e., the direction in which the ball is to be moved) can also be estimated based on the direction in which a leg of the human body is lifted. The use of the estimation result makes it possible to control the direction of the angle of view to accurately follow the motion of the ball even under a state where the ball is kicked by the human body and thus the motion of the ball is rapidly changed.

(Hardware Configuration)

An example of a hardware configuration of an information processing apparatus 200 will be described with reference to FIG. 11. In the present exemplary embodiment, the angle-of-view control apparatus A1002 is implemented by an information processing apparatus similar to the information processing apparatus 200. The information processing apparatus 200 includes a central processing unit (CPU) 211, a read-only memory (ROM) 212, a random access memory (RAM) 213, an auxiliary storage device 214, a display unit 215, an operation unit 216, a communication interface (I/F) 217, and a bus 218.

The CPU 211 controls an overall operation of the information processing apparatus 200 by using computer programs and data stored in the ROM 212 or the RAM 213. Thus, the CPU 211 implements each function of the angle-of-view control apparatus A1002 illustrated in FIG. 1. The information processing apparatus 200 may include one or more dedicated hardware modules different from the CPU 211, and at least a part of processing to be executed by the CPU 211 may be executed by the dedicated hardware modules. Examples of the dedicated hardware modules include an application specific integrated circuit (ASIC), a field-programmable gate array (FPGA), and a digital signal processor (DSP). The ROM 212 stores programs and the like that need not be changed. The RAM 213 temporarily stores programs and data supplied from the auxiliary storage device 214, and data and the like supplied from an external apparatus via the communication I/F 217. The auxiliary storage device 214 includes, for example, a hard disk drive, and stores various data such as image data.

The display unit 215 includes, for example, a liquid crystal display or a light-emitting diode (LED), and displays a graphical user interface (GUI) or the like for the user to operate the information processing apparatus 200. The operation unit 216 includes, for example, a keyboard, a mouse, a joystick, or a touch panel. The operation unit 216 receives an operation performed by the user, and inputs various instructions to the CPU 211.

The communication I/F 217 is used to communicate with an external apparatus of the information processing apparatus 200. For example, when the information processing apparatus 200 is connected to the external apparatus by a wired connection, a communication cable is connected to the communication I/F 217. When the information processing apparatus 200 includes a function for wirelessly communicating with the external apparatus, the communication I/F 217 includes an antenna. The bus 218 connects the units of the information processing apparatus 200 to transmit information.

Figure 11:
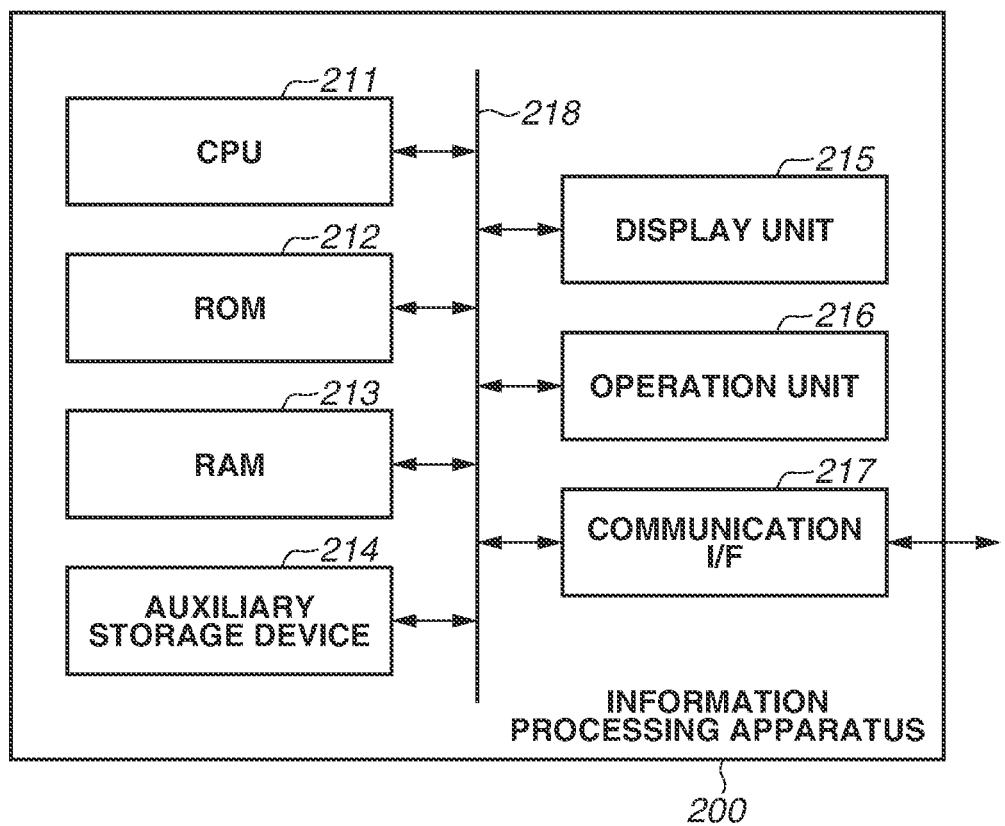
FIG. 11 is a diagram illustrating an example of a hardware configuration of an information processing apparatus.

FIG. 11 illustrates an example where the display unit 215 and the operation unit 216 are disposed in the information processing apparatus 200. However, at least one of the display unit 215 and the operation unit 216 may be disposed as a separate device on the outside of the information processing apparatus 200. In this case, the CPU 211 may operate as a display control unit that controls the display unit 215, and may also operate as an operation control unit that controls the operation unit 216.

Figure 12:
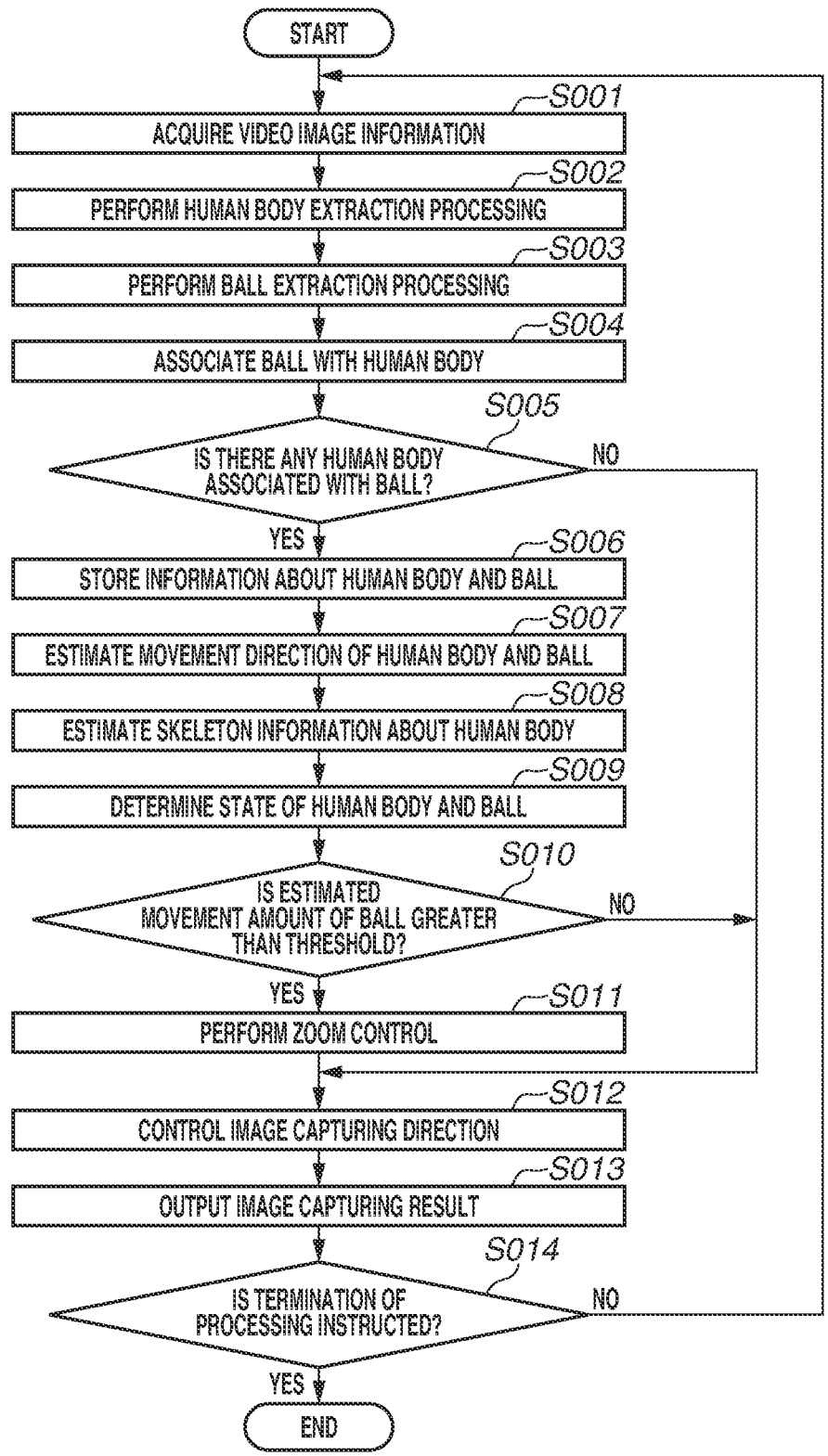
FIG. 12 is a flowchart illustrating an example of processing that is performed by the image capturing system.

The CPU 211 of the angle-of-view control apparatus A1002 executes processing based on programs stored in the ROM 212 or the auxiliary storage device 214 of the angle-of-view control apparatus A1002, and therefore the functions illustrated in FIG. 1 and the processing illustrated in FIG. 12 are implemented. This also holds true for functions illustrated in FIG. 13 and processing illustrated in FIG. 16 according to a second exemplary embodiment to be described below, and for functions illustrated in FIG. 17 and processing illustrated in FIG. 20 according to the third exemplary embodiment to be described below.

(Processing)

An example of processing to be performed by the image capturing system A1000 will be described with reference to FIG. 12. The image capturing system A1000 starts execution of a series of processing illustrated in FIG. 12 based on, for example, a user's instruction received via a predetermined input apparatus.

In step S001, the video image acquisition unit A1003 acquires image data based on the image capturing result from the image capturing apparatus A1001.

In step S002, the human body extraction unit A1004 performs image processing on the image indicated by the image data acquired by the video image acquisition unit A1003, to extract each human body captured in the image.

In step S003, the attention target extraction unit A1005 performs image processing on the image indicated by the image data acquired by the video image acquisition unit A1003, to extract a ball (a subject set as an attention target) captured in the image.

In step S004, the association unit A1006 associates the ball extracted from the image in step S002 with the human body extracted from the image in step S003. As a specific example, in a case where a human body at a distance of less than or equal to the threshold from the ball is extracted, the association unit A1006 associates the human body with the ball.

In step S005, the association unit A1006 determines whether the human body is associated with the ball. In a case where the association unit A1006 determines that the human body is not associated with the ball in step S005 (NO in step S005), the processing proceeds to step S012. Meanwhile, in a case where the association unit A1006 determines that the human body is associated with the ball in step S005 (YES in step S005), the association unit A1006 outputs the information based on the result of associating the ball with the human body to the object information storing unit A1007 and the skeleton information estimation unit A1009. In the following description, the information based on the result of associating the ball with the human body is also referred to as "association information" for convenience of explanation. Then, the processing proceeds to step S006.

In step S006, the object information storing unit A1007 acquires association information for each frame from the association unit A1006 and stores the association information. Further, in a case where the association information for the latest frame and the association information for a frame immediately preceding the latest frame are stored, the object information storing unit A1007 outputs the association information corresponding to these stored frames to the movement direction estimation unit A1008. Meanwhile, in a case where the association information corresponding to the frame immediately preceding the latest frame is not stored, the object information storing unit A1007 outputs the association information corresponding to the latest frame to the movement direction estimation unit A1008. Then, the processing proceeds to step S007.

In step S007, the movement direction estimation unit A1008 acquires the association information for each of the latest frame and the frame immediately preceding the latest frame from the object information storing unit A1007. The movement direction estimation unit A1008 estimates the movement direction of each of the human body and the ball based on the association information acquired for these frames, and outputs information corresponding to the estimation result to the angle-of-view control unit A1012.

In step S008, the skeleton information estimation unit A1009 acquires the association information for each frame from the association unit A1006, and estimates skeleton information about the human body based on the association information. The skeleton information estimation unit A1009 outputs the estimation result of the skeleton information about the human body to the state determination unit A1010.

In step S009, the state determination unit A1010 acquires the estimation result of the skeleton information about the human body from the skeleton information estimation unit A1009, and determines a state (e.g., a motion state) of the human body based on the estimation result of the skeleton information about the human body. Further, the state determination unit A1010 determines a state (e.g., a movement state) of the ball based on the determination result of the state of the human body. The state determination unit A1010 estimates the movement amount of the ball based on the determination result of the state of the ball. The state determination unit A1010 outputs information based on the determination result of the state of each of the human body and the ball (e.g., information based on the estimation result of the movement amount of the ball) to the angle-of-view determination unit A1011. Then, the processing proceeds to step S010.

In step S010, the angle-of-view determination unit A1011 acquires the information based on the determination result of the state of each of the human body and the ball (e.g., information based on the estimation result of the movement amount of the ball) from the state determination unit A1010. The angle-of-view determination unit A1011 determines whether the estimation result of the movement amount of the ball (hereinafter also referred to as an "estimated movement amount of the ball") is greater than a threshold, based on the information based on the determination result of the state of each of the human body and the ball.

In a case where the angle-of-view determination unit A1011 determines that the estimated movement amount of the ball is greater than the threshold in step S010 (YES in step S010), the angle-of-view determination unit A1011 determines the magnification ratio for image capturing based on the estimated movement amount of the ball, and outputs information about the magnification ratio to the angle-of-view control unit A1012. Then, the processing proceeds to step S011.

Meanwhile, in a case where the angle-of-view determination unit A1011 determines that the estimated movement amount of the ball is less than or equal to the threshold in step S010 (NO in step S010), the processing proceeds to step S012. In this case, the processing of step S011 is skipped.

In step S011, the angle-of-view control unit A1012 acquires the information about the magnification ratio for image capturing from the angle-of-view determination unit A1011, and performs the zoom control operation based on the magnification ratio.

In step S012, the angle-of-view control unit A1012 acquires information based on the estimation result of the movement direction of each of the human body and the ball from the movement direction estimation unit A1008. The angle-of-view control unit A1012 performs an angle-of-view direction control operation, such as pan control and tilt control, based on the acquired information. Meanwhile, in a case where the above-described information is not output from the movement direction estimation unit A1008 (e.g., in a case where the movement direction estimation unit A1008 has not detected any motion of the human body), the angle-of-view control unit A1012 may control the angle of view to set an image capturing direction to the same direction that is previously set. As described above, the angle-of-view control unit A1012 controls the angle of view and outputs image data indicating the image obtained after the angle of view is controlled to the output control unit A1013.

In step S013, the output control unit A1013 acquires the image data from the angle-of-view control unit A1012, and causes the output apparatus A1014 to output the image indicated by the image data. The output apparatus A1014 displays the image based on the image data described above on the screen in accordance with an instruction from the output control unit A1013, whereby the image is presented to the user.

In step S014, the angle-of-view control apparatus A1002 determines whether termination of the series of processing illustrated in FIG. 12 is instructed. As a specific example, the angle-of-view control apparatus A1002 may determine whether termination of the series of processing illustrated in FIG. 12 is instructed, based on whether an input unit (e.g., an on/off switch), which is not illustrated in FIG. 1, has received an instruction to interrupt image capturing processing from the user.

In a case where the angle-of-view control apparatus A1002 determines that termination of the series of processing is not instructed in step S014 (NO in step S014), the processing returns to step S001 to execute the series of processing illustrated in FIG. 12 again from step S001.

Meanwhile, in a case where the angle-of-view control apparatus A1002 determines that termination of the series of processing is instructed in step S014 (YES in step S014), the series of processing illustrated in FIG. 12 is terminated.

By the above-described control operation, even when the movement or speed of the ball is rapidly changed, the movement of the ball is estimated by analyzing the motion state of the human body associated with the ball and the angle of view can be controlled using the estimation result. Consequently, the image capturing system A1000 can continuously perform image capturing processing, while enabling the ball to be continuously captured within the angle of view, even when the movement or speed of the ball is rapidly changed.

An image capturing system according to the second exemplary embodiment of the present disclosure will be described below. The second exemplary embodiment also takes as an example a case where the angle of view of the image capturing apparatus is controlled by focusing on the motion of a ball in a soccer game, like in the first exemplary embodiment, and features of the image capturing system will be described in detail. Differences between the second exemplary embodiment and the first exemplary embodiment are mainly described below, and redundant detailed descriptions of parts of the second exemplary embodiment that are substantially the same as those of the first exemplary embodiment are omitted. Accordingly, unless otherwise noted, hardware configurations, functional configurations, processing, and the like similar to those of the first exemplary embodiment are also applicable to the second exemplary embodiment.

(Functional Configuration)

An example of each functional configuration of the image capturing system according to the second exemplary embodiment will be described with reference to FIG. 13. In the following description, the image capturing system according to the present exemplary embodiment is also referred to as an "image capturing system B1000" to distinguish the image capturing system according to the present exemplary embodiment from the image capturing systems according to other exemplary embodiments.

The image capturing system B1000 is a system that recognizes each human body and a ball from an image obtained by image capturing a field of a soccer stadium, adjusts the angle of view to capture the ball within the angle of view of the image capturing apparatus, and outputs an image based on an image capturing result to an output apparatus such as a display.

The image capturing system B1000 includes the image capturing apparatus A1001, an angle-of-view control apparatus B1002, and the output apparatus A1014. The image capturing apparatus A1001 and the angle-of-view control apparatus B1002 are connected with each other via, for example, a video interface. Thus, image data based on the result of image capturing by the image capturing apparatus A1001 can be transferred to the angle-of-view control apparatus B1002. The interface for connecting the image capturing apparatus A1001 and the angle-of-view control apparatus B1002 is not particularly limited as long as the image data based on the result of image capturing by the image capturing apparatus A1001 can be transferred to the angle-of-view control apparatus B1002.

The angle-of-view control apparatus B1002 acquires the image data based on the image capturing result from the image capturing apparatus A1001, and extracts a subject (ball) set as an attention target from the image indicated by the image data and each human body set as another subject different from the subject. The angle-of-view control apparatus B1002 estimates a motion of the human body by estimating skeleton information about the human body extracted from the image, and estimates a subsequent motion of the ball, which is set as the attention target, by using the estimation result of the motion of the human body. The angle-of-view control apparatus B1002 controls the angle of view of the image capturing apparatus A1001 based on the estimation result of the motion of the ball.

Examples of the angle-of-view control operation include pan control and tilt control for controlling the direction of the angle of view by adjusting the image capturing direction horizontally and vertically, and zoom control for controlling the magnification ratio for image capturing. Like in the angle-of-view control apparatus A1002 according to the first exemplary embodiment, the angle-of-view control method is not particularly limited as long as the above-described angle-of-view control operation can be achieved.

Each functional configuration of the angle-of-view control apparatus B1002 will now be described in more detail below. The angle-of-view control apparatus B1002 includes the video image acquisition unit A1003, the human body extraction unit A1004, the attention target extraction unit A1005, the association unit A1006, and the object information storing unit A1007. The angle-of-view control apparatus A1002 also includes the movement direction estimation unit A1008, a skeleton information estimation unit B1009, the state determination unit A1010, an angle-of-view determination unit B1011, the angle-of-view control unit A1012, and the output control unit A1013.

The skeleton information estimation unit B1009 acquires coordinate information about the human body from the association unit A1006, and estimates skeleton information about the human body based on the coordinate information about the human body. The method of estimating the skeleton information is similar to that of the skeleton information estimation unit A1009 according to the first exemplary embodiment, and thus a redundant detailed description thereof is omitted.

The skeleton information estimation unit B1009 clips a partial image corresponding to an area indicated by the coordinate information about the human body from the image indicated by the image data acquired from the image capturing apparatus A1001, and estimates skeleton information about the human body by applying the skeleton estimation technique to the partial image. Then, the skeleton information estimation unit B1009 outputs the estimation result of the skeleton information about the human body to the state determination unit A1010. In this case, the state determination unit A1010 determines the state of each of the human body and the ball based on the estimation result of the skeleton information about the human body, and outputs information based on the determination result (e.g., information based on the estimation result of the movement amount of the ball) to the angle-of-view determination unit A1011. Further, the skeleton information estimation unit B1009 outputs information indicating that the skeleton information about the human body has been estimated to the angle-of-view determination unit B1011.

Meanwhile, in a case where the skeleton information estimation unit B1009 has not estimated the skeleton information about the human body (e.g., in a case where it is difficult to estimate the skeleton information about the human body), the skeleton information estimation unit B1009 outputs information indicating that the estimation has not been performed to the angle-of-view determination unit B1011.

In a case where the skeleton information estimation unit B1009 has estimated the skeleton information about the human body, the angle-of-view determination unit B1011 acquires information based on the determination result of the state of each of the human body and the ball from the state determination unit A1010, and determines the control method and control amount for controlling the angle of view for image capturing based on the acquired information. As a specific example, the angle-of-view determination unit B1011 may acquire the estimated movement amount of the ball from the state determination unit A1010, and may determine the control method and control amount for controlling the angle of view based on the estimated movement amount of the ball.

Meanwhile, in a case where the skeleton information estimation unit B1009 has not estimated the skeleton information about the human body, the angle-of-view determination unit B1011 acquires information indicating that the estimation has not been performed from the skeleton information estimation unit B1009. In this case, the angle-of-view determination unit B1011 determines the magnification ratio for image capturing in a manner such that the size of the human body in the captured image is kept to such an extent that skeleton information about the human body can be estimated, and outputs information about the magnification ratio to the angle-of-view control unit A1012. To estimate skeleton information about the human body, the size of human body to be captured in the image may be specified in advance, for example, based on a preliminary experiment or the like. Information based on the specifying result may be stored in a storage area that can be referred to by the angle-of-view determination unit B1011.

Figure 14:
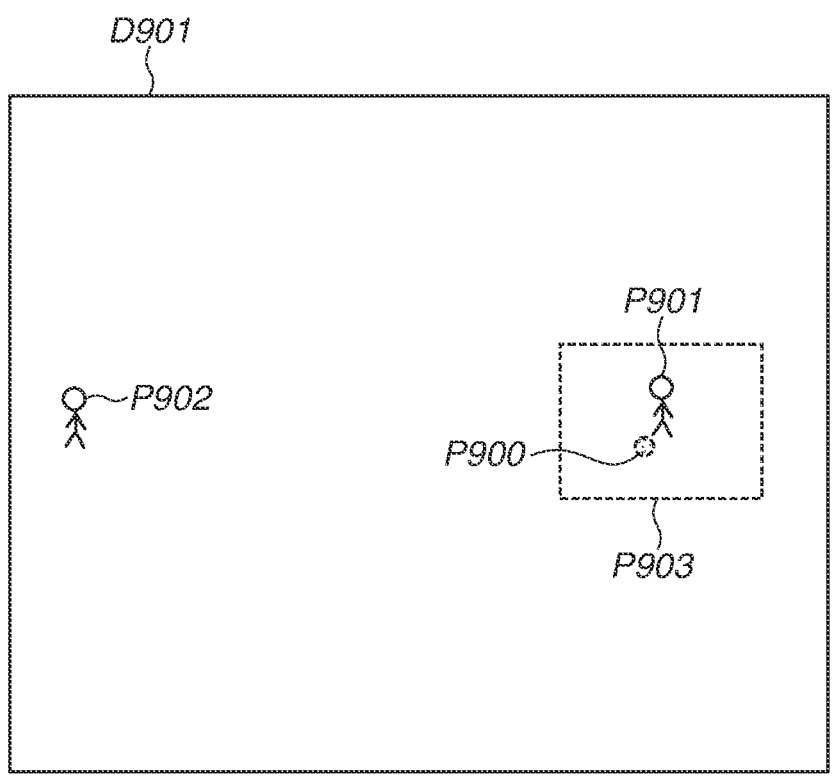
FIG. 14 is a diagram illustrating an example of processing for determining a magnification ratio for image capturing.
Figure 15:
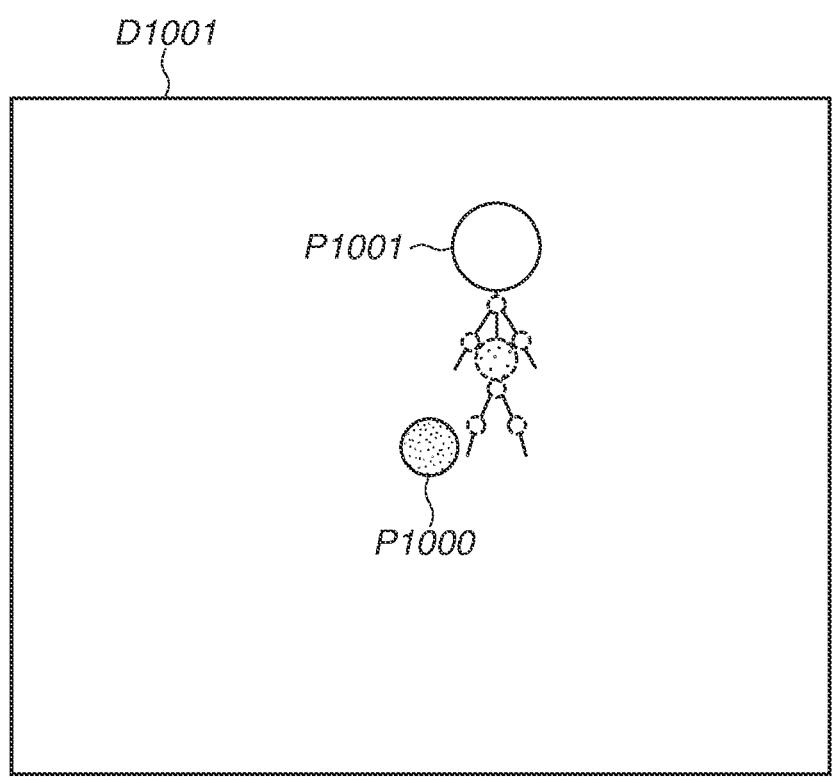
FIG. 15 is a diagram illustrating an example of processing for determining the magnification ratio for image capturing.

An example of processing in which the angle-of-view determination unit B1011 determines the magnification ratio for image capturing in a manner such that the size of each human body in the captured image is kept to such an extent that skeleton information about the human body can be estimated will now be described with reference to FIGS. 14 and 15.

First, FIG. 14 will be described. An image D901 is an image to be used for estimation of skeleton information about each human body. A ball P900 is included in the image D901. Human bodies P901 and P902 are also included in the image D901. The human body P901 is associated with the ball P900. In the example illustrated in FIG. 14, the size of the human body P901 captured in the image D901 is too small to identify each region of the human body P901, and thus it is difficult to estimate skeleton information about the human body P901. Therefore, the angle-of-view determination unit B1011 determines the magnification ratio for image capturing in a manner such that skeleton information about the human body can be estimated by enlarging an area P903 in the image D901.

Next, FIG. 15 will be described. An image D1001 is obtained by enlarging the area P903 in the image D901 illustrated in FIG. 14. A ball P1000 is included in the image D1001. The ball P1000 corresponds to the ball P900 in the image D901 illustrated in FIG. 14. A human body P1001 is also included in the image D1001. The human body P1001 corresponds to the human body P901 in the image D901 illustrated in FIG. 14. As illustrated in FIG. 15, since the human body P1001 is captured with a sufficiently large size, it is possible to identify each region of the human body P1001, and thus it is possible to estimate skeleton information about the human body P1001.

A zoom-in control operation for acquiring the image D1001 is performed by the angle-of-view control unit A1012, based on the information about the magnification ratio for image capturing sent from the angle-of-view determination unit B1011.

Each functional configuration of the image capturing system B1000 according to the second exemplary embodiment has been described above by focusing in particular on the parts different from the image capturing system A1000 according to the first exemplary embodiment. The operation of each of the functional blocks other than those described above are substantially the same as that of the image capturing system A1000 according to the first exemplary embodiment, and thus the detailed redundant description thereof is omitted.

(Processing)

An example of processing to be performed by the image capturing system B1000 will be described with reference to FIG. 16. The image capturing system B1000 starts execution of a series of processing illustrated in FIG. 16 according to, for example, an instruction received from the user via a predetermined apparatus.

In step S101, the video image acquisition unit A1003 acquires image data based on the image capturing result from the image capturing apparatus A1001.

In step S102, the human body extraction unit A1004 performs image processing on the image indicated by the image data acquired by the video image acquisition unit A1003, to extract each human body captured in the image.

In step S103, the attention target extraction unit A1005 performs image processing on the image indicated by the image data acquired by the video image acquisition unit A1003, to extract a ball (a subject set as an attention target) captured in the image.

In step S104, the association unit A1006 associates the ball extracted from the image in step S102 with the human body extracted from the image in step S103. As a specific example, in a case where a human body at a distance of less than or equal to the threshold from the ball is extracted, the association unit A1006 associates the human body with the ball.

In step S105, the association unit A1006 determines whether the human body is associated with the ball. In a case where the association unit A1006 determines that the human body is not associated with the ball in step S105 (NO in step S105), the processing proceeds to step S114. Meanwhile, in a case where the association unit A1006 determines that the human body is associated with the ball in step S105 (YES in step S105), the association unit A1006 outputs association information based on the result of associating the human body with the ball to each of the object information storing unit A1007 and the skeleton information estimation unit B1009. Then, the processing proceeds to step S106.

In step S106, the object information storing unit A1007 acquires association information for each frame from the association unit A1006, and stores the association information. Further, when the association information for the latest frame and the association information for the frame immediately preceding the latest frame are stored, the object information storing unit A1007 outputs the association information corresponding to these frames to the movement direction estimation unit A1008. Meanwhile, in a case where the association information corresponding to the frame immediately preceding the latest frame is not stored, the object information storing unit A1007 outputs the association information corresponding to the latest frame to the movement direction estimation unit A1008. Then, the processing proceeds to step S107.

In step S107, the movement direction estimation unit A1008 acquires association information for each of the latest frame and the frame immediately preceding the latest frame from the object information storing unit A1007. The movement direction estimation unit A1008 estimates the movement direction of each of the human body and the ball using the association information acquired for these frames, and outputs information based on the estimation result to the angle-of-view control unit A1012.

In step S108, the skeleton information estimation unit B1009 acquires association information for each frame from the association unit A1006, and estimates skeleton information about the human body based on the association information.

In step S109, the skeleton information estimation unit B1009 determines whether skeleton information about the human body is successfully estimated (has been estimated). In a case where the skeleton information estimation unit B1009 determines that the skeleton information about the human body is successfully estimated (has been estimated) in step S109 (YES in step S109), the skeleton information estimation unit B1009 outputs the information based on the estimation result of the skeleton information about the human body to the state determination unit A1010. Further, the skeleton information estimation unit B1009 outputs information indicating that the skeleton information about the human body is successfully estimated (skeleton information about the human body has been estimated) to the angle-of-view determination unit B1011. Then, the processing proceeds to step S11.

Meanwhile, in a case where the skeleton information estimation unit B1009 determines that the skeleton information about the human body is not successfully estimated (has not been estimated) in step S109 (NO in step S109), the skeleton information estimation unit B1009 outputs information indicating that the skeleton information about the human body is not successfully estimated (skeleton information about the human body has not been estimated) to the angle-of-view determination unit B1011. Then, the processing proceeds to step S110.

In step S110, the angle-of-view determination unit B1011 determines the magnification ratio for image capturing in a manner such that the size of each human body in the captured image is kept to such an extent that the skeleton information about the human body can be estimated, and outputs information about the magnification ratio to the angle-of-view control unit A1012. The angle-of-view control unit A1012 performs the zoom-in control operation based on the information about the magnification ratio for image capturing sent from the angle-of-view determination unit B1011. Then, the processing proceeds to step S108. In this case, in step S108, the skeleton information estimation unit B1009 estimates the skeleton information about the human body again based on the image obtained after the zoom control operation is performed by the angle-of-view control unit A1012.

In step S111, the state determination unit A1010 acquires the estimation result of the skeleton information about the human body from the skeleton information estimation unit B1009, and determines a state (e.g., an motion state) of the human body based on the estimation result of the skeleton information about the human body. Further, the state determination unit A1010 determines a state (e.g., a movement state) of the ball based on the determination result of the state of the human body. The state determination unit A1010 estimates the movement amount of the ball based on the determination result of the state of the ball. The state determination unit A1010 outputs information based on the determination result of the state of each of the human body and the ball (e.g., information based on the result of the movement amount of the ball) to the angle-of-view determination unit A1011.

In step S112, the angle-of-view determination unit A1011 acquires information based on the determination result of the state of each of the human body and the ball (e.g., information based on the estimation result of the movement amount of the ball) from the state determination unit A1010. The angle-of-view determination unit A1011 determines whether the estimation result of the movement amount of the ball (estimated movement amount of the ball) is greater than the threshold using the information based on the determination result of the state of each of the human body and the ball.

In a case where the angle-of-view determination unit A101 determines that the estimated movement amount of the ball is greater than the threshold in step S12 (YES in step S112), the angle-of-view determination unit A1011 determines the magnification ratio for image capturing based on the estimated movement amount of the ball, and outputs information about the magnification ratio to the angle-of-view control unit A1012. As a specific example, in a case where the estimated movement amount of the ball is greater than the threshold, the angle-of-view determination unit A1011 determines that a zoom-out control operation is to be performed and determines the magnification ratio for the zoom-out control operation, and then outputs information about the magnification ratio to the angle-of-view control unit A1012. Then, the processing proceeds to step S113.

Meanwhile, in a case where the angle-of-view determination unit A1011 determines that the estimated movement amount of the ball is less than or equal to the threshold in step S112 (NO in step S112), the processing proceeds to step S114. In this case, the processing of step S113 is skipped.

In step S113, the angle-of-view control unit A1012 acquires information about the magnification ratio for image capturing from the angle-of-view determination unit A1011, and performs the zoom control operation in accordance with the magnification ratio.

In step S114, the angle-of-view control unit A1012 acquires information based on the estimation result of the movement direction of each of the human body and the ball from the movement direction estimation unit A1008. The angle-of-view control unit A1012 performs a control operation for controlling the direction of the angle of view, such as pan control and tilt control, based on the acquired information. Meanwhile, in a case where the above-described information is not output from the movement direction estimation unit A1008 (e.g., in a case where the movement direction estimation unit A1008 has not detected any movement of the human body), the angle-of-view control unit A1012 may control the angle of view to set image capturing direction to the same direction that is previously set. As described above, the angle-of-view control unit A1012 controls the angle of view and outputs the image data indicating the image obtained after the angle of view is controlled to the output control unit A1013.

In step S115, the output control unit A1013 acquires the image data from the angle-of-view control unit A1012, and outputs the image indicated by the image data to the output apparatus A1014. The output apparatus A1014 displays the image based on the image data described above on the screen in accordance with an instruction from the output control unit A1013, whereby the image is presented to the user.

Figure 16:
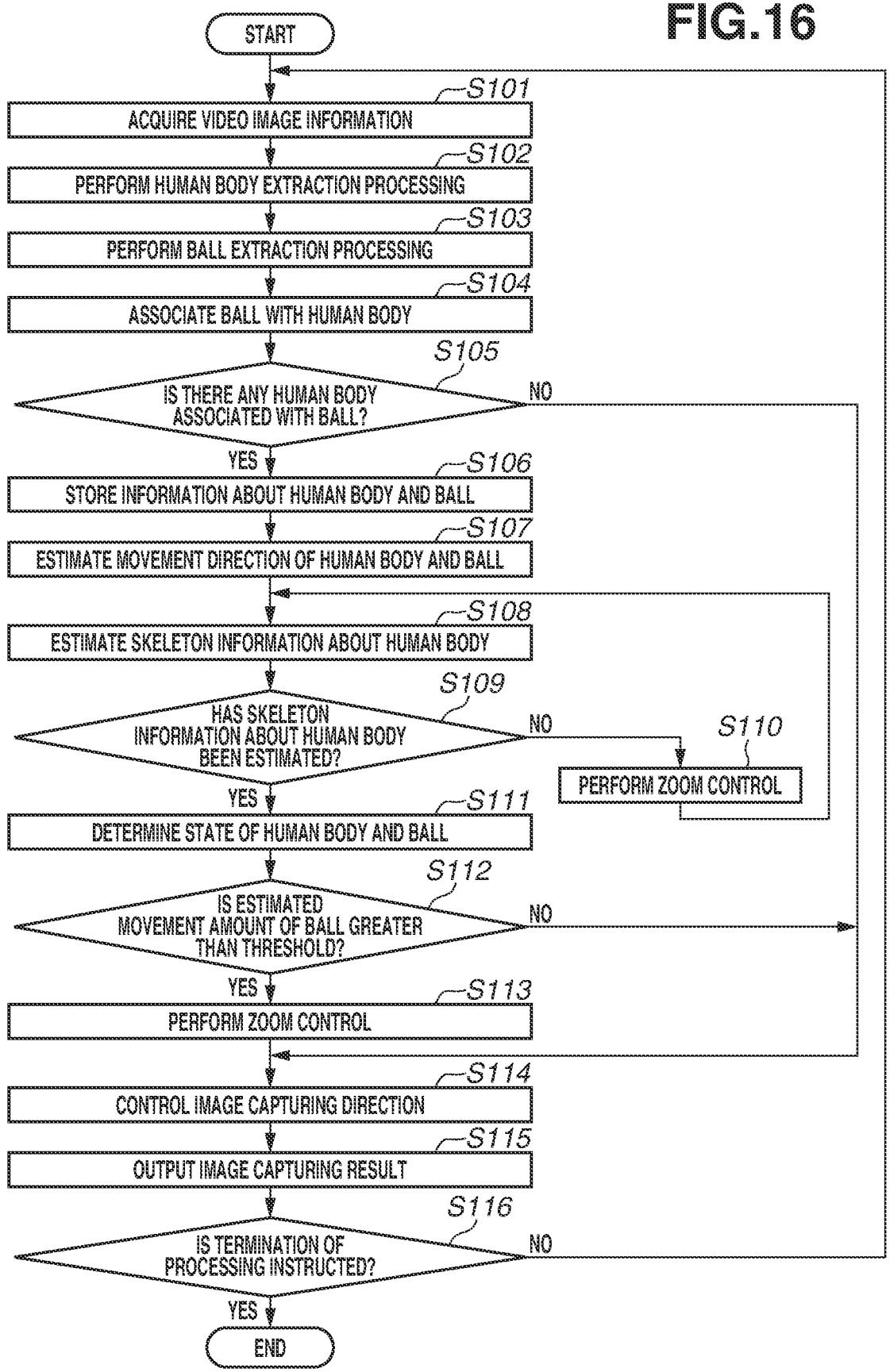
FIG. 16 is a flowchart illustrating an example of processing that is performed by the image capturing system.

In step S116, the angle-of-view control apparatus A1002 determines whether termination of the series of processing illustrated in FIG. 16 is instructed. As a specific example, the angle-of-view control apparatus A1002 may determine whether termination of the series of processing illustrated in FIG. 16 is instructed, based on whether an input unit (e.g., an on/off switch), which is not illustrated in FIG. 1, has received an instruction to interrupt image capturing processing from the user.

In a case where the angle-of-view control apparatus A1002 determines that termination of the series of processing is not instructed in step S116 (NO in step S116), the processing returns to step S101 to execute the series of processing illustrated in FIG. 16 again from step S101.

Meanwhile, in a case where the angle-of-view control apparatus A1002 determines that termination of the series of processing is instructed in step S116 (YES in step S116), the series of processing illustrated in FIG. 16 is terminated.

By the above-described control operation, even when the movement or speed of the ball is rapidly changed, the movement of the ball is estimated by analyzing the motion state of the human body associated with the ball and the angle of view can be controlled using the estimation result. In addition, in a case where it is difficult to estimate skeleton information about each human body from the captured image, the zoom control operation is performed to such an extent that skeleton information about a target human body is estimated. Since, even when it is difficult to discriminate each region of each human body captured in an image, the magnitude of the angle of view is controlled in a manner such that an enlarged image of the human body is captured, it is possible to accurately analyze the motion state of each human body, and thus it is possible to accurately estimate the movement of the ball.

An image capturing system according to a third exemplary embodiment of the present disclosure will be described below. The third exemplary embodiment also takes as an example a case where the angle of view of the image capturing apparatus is controlled by focusing on the movement of a ball in a soccer game, like in the first and second exemplary embodiments, and features of the image capturing system will be described in detail. Differences between the third exemplary embodiment and the first and second exemplary embodiment are mainly described below, and detailed redundant descriptions of parts of the third exemplary embodiment that are substantially the same as those of the first and second exemplary embodiments are omitted. Accordingly, unless otherwise noted, hardware configurations, functional configurations, processing, and the like similar to those of the first and second exemplary embodiments are also applicable to the third exemplary embodiment.

(Functional Configuration)

An example of each functional configuration of the image capturing system according to the third exemplary embodiment will be described with reference to FIG. 17. In the following description, the image capturing system according to the third exemplary embodiment is also referred to as an "image capturing system C1000" to distinguish the image capturing system according to the third exemplary embodiment from the image capturing systems according to other exemplary embodiments. Similarly, the angle-of-view control apparatus according to the third exemplary embodiment is also referred to as an "angle-of-view control apparatus C1002" to distinguish the angle-of-view control apparatus according to the third exemplary embodiment from the angle-of-view control apparatuses according to other exemplary embodiments.

The image capturing system C1000 is a system that recognizes each human body and a ball from an image obtained by image capturing a field of a soccer stadium, adjusts the angle of view in a manner such that the ball is captured within the angle of view of the image capturing apparatus, and outputs an image based on the image capturing result to an output apparatus such as a display.

The image capturing system B1000 includes the image capturing apparatus A1001, the angle-of-view control apparatus C1002, and the output apparatus A1014. The image capturing apparatus A1001 and the angle-of-view control apparatus C1002 are connected with each other via, for example, a video interface. Thus, image data based on the result of image capturing by the image capturing apparatus A1001 can be transferred to the angle-of-view control apparatus C1002. The interface for connecting the image capturing apparatus A1001 and the angle-of-view control apparatus C1002 is not particularly limited as long as the image data based on the result of image capturing by the image capturing apparatus A1001 can be transferred to the angle-of-view control apparatus C1002.

The angle-of-view control apparatus C1002 acquires image data based on the image capturing result from the image capturing apparatus A1001, and extracts, from the image indicated by the image data, a subject (ball) set as an attention target and each human body set as another subject different from the subject. The angle-of-view control apparatus C1002 estimates a motion of the human body by estimating skeleton information about the human body extracted from the image, and estimates a subsequent movement of the ball set as the attention target by using the estimation result of the motion of the human body. The angle-of-view control apparatus C1002 controls the angle of view of the image capturing apparatus A1001 based on the estimation result of the movement of the ball.

Examples of the angle-of-view control operation include pan control and tilt control for controlling the direction of the angle of view by adjusting the image capturing direction horizontally and vertically, and zoom control for controlling the magnification ratio for image capturing. Like in the angle-of-view control apparatus A1002 according to the first exemplary embodiment, the angle-of-view control method is not particularly limited as long as the above-described angle-of-view control operation can be achieved.

Each functional configuration of the angle-of-view control apparatus C1002 will now be described in more detail below. The angle-of-view control apparatus C1002 includes the video image acquisition unit A1003, the human body extraction unit A1004, the attention target extraction unit A1005, the association unit A1006, and the object information storing unit A1007. The angle-of-view control apparatus A1002 also includes the movement direction estimation unit A1008, the skeleton information estimation unit A1009, the state determination unit A1010, the angle-of-view determination unit A1011, the angle-of-view control unit A1012, and the output control unit A1013. The angle-of-view control apparatus C1002 also includes an inter-human-body distance calculation unit C1015 and a magnification ratio control unit C1016.

The inter-human-body distance calculation unit C1015 acquires information based on the extraction result of the human body from the image from the human body extraction unit A1004. In a case where the skeleton information estimation unit A1009 has not estimated (cannot successfully estimate) the skeleton information about the human body, the inter-human-body distance calculation unit C1015 acquires information indicating that the estimation has not been performed and association information based on the result of associating the ball and the human body extracted from the image.

In a case where the skeleton information estimation unit A1009 has not estimated the skeleton information about the human body, the inter-human-body distance calculation unit C1015 calculates a distance between the human body associated with the ball and each of human bodies other than the human body, based on the association information and the extraction result of each human body from the image. The inter-human-body distance calculation unit C1015 outputs coordinate information about each human body and a list of other human bodies (hereinafter also referred to as an "inter-human-body distance list") to the magnification ratio control unit C1016. The inter-human-body distance list is created by arranging the human bodies in order of distance from the human body associated with the ball.

The magnification ratio control unit C1016 acquires the inter-human-body distance list and coordinate information about each human body from the inter-human-body distance calculation unit C1015. The magnification ratio control unit C1016 determines the magnification ratio (in other words, the magnitude of the angle of view) for image capturing in a manner such that a predetermined number of human bodies is captured within the angle of view centered on the human body associated with the ball, based on the acquired inter-human-body distance list and the coordinate information about each human body.

An example of processing in which the magnification ratio control unit C1016 determines the magnification ratio for image capturing in a manner such that a predetermined number of human bodies is captured within the angle of view centered on the human body associated with the ball will now be described with reference to FIGS. 18 and 19.

First, FIG. 18 will be described. An image D1101 is an image from which each human body is extracted. A ball P1100 is included in the image D1101. Human bodies P1101 to P1108 are also included. The human body P101 is associated with the ball P1100.

The magnification ratio control unit C1016 selects other human bodies closer to the human body P1101 associated with the ball P1100 by the number corresponding to the number obtained by subtracting "1" from a predetermined number of human bodies from among the human bodies P1102 to P1108, based on the acquired inter-human-body distance list. Thus, human bodies are selected in a manner such that the sum of the human body P1101 associated with the ball P1100 and the human bodies closer to the human body P1101 equals the predetermined number. Further, the magnification ratio control unit C1016 calculates the magnitude of the angle of view in a manner such that all the selected human bodies can be captured within the angle of view.

Figure 18:
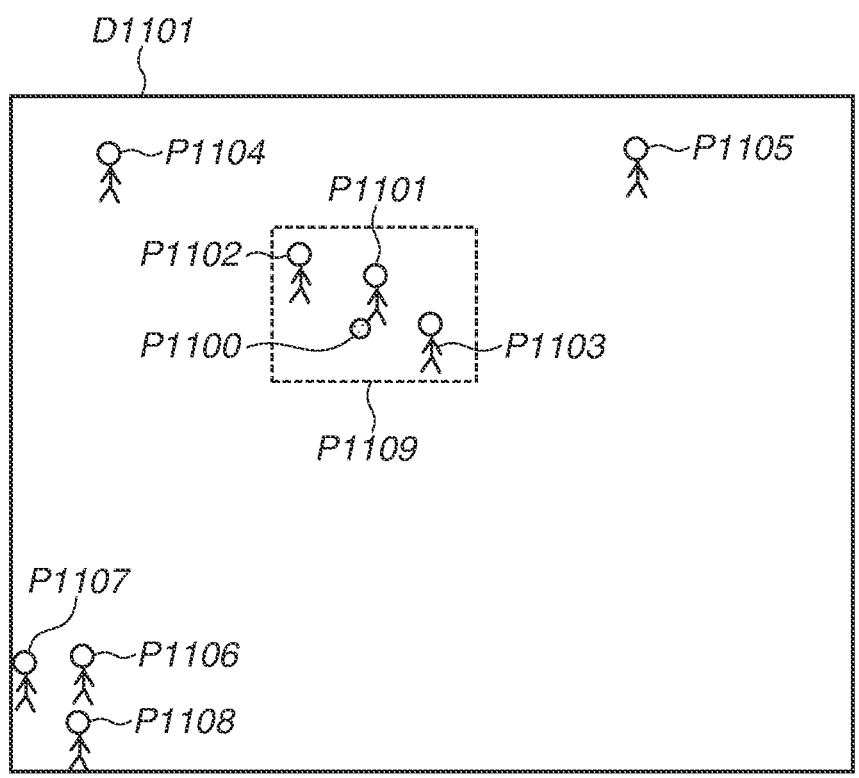
FIG. 18 is a diagram illustrating an example of processing for determining the magnification ratio for image capturing.
Figure 19:
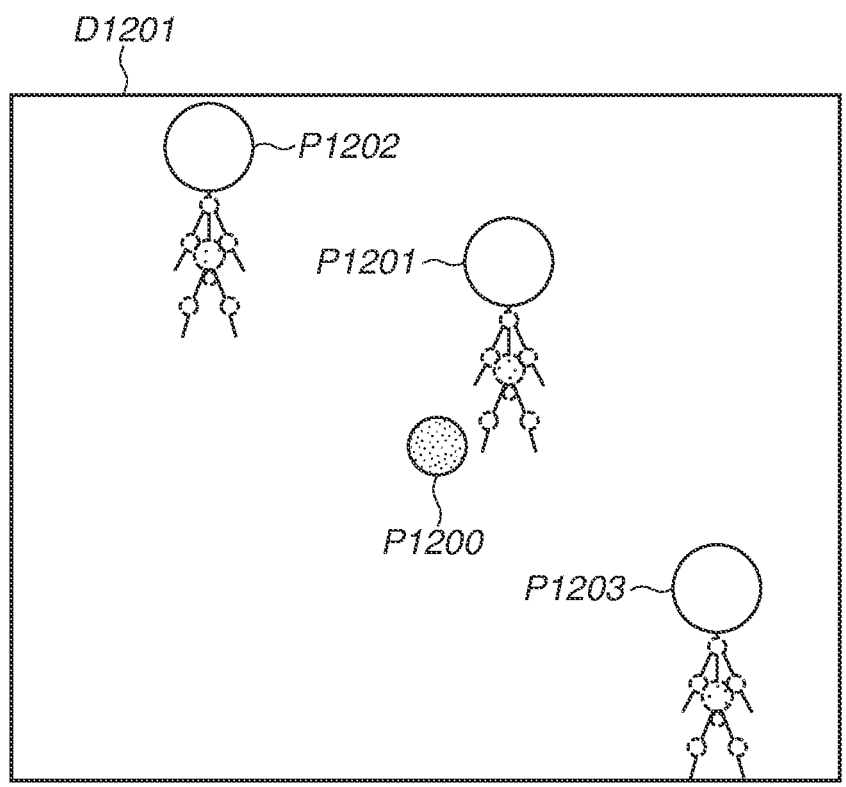
FIG. 19 is a diagram illustrating an example of processing for determining the magnification ratio for image capturing.

For example, in the example illustrated in FIG. 18, three human bodies are set as the predetermined number of human bodies. In this case, the magnification ratio control unit C1016 selects the human bodies P1102 and 1103 as human bodies closer to the human body P1101 associated with the ball P1100 than others. Further, the magnification ratio control unit C1016 controls the magnitude of the angle of view in a manner such that all the human bodies P1101 to P1103 are captured within the angle of view. For example, an area P1109 represents an example area in which all the human bodies P1101 to P1103 are captured within the angle of view.

Next, FIG. 19 will be described. An image D1201 is an image obtained by enlarging the area P1109 in the image D1101 illustrated in FIG. 18. A ball P1200 is included in the image D1201. The ball P1200 corresponds to the ball P100 in the image D1101 illustrated in FIG. 18. Human bodies P1201 to P1203 are also included. The human bodies P1201 to P1203 correspond to the human bodies P1101 to P1103, respectively, in the image D1101 illustrated in FIG. 18.

A zoom-in control operation for acquiring the image D1201 is performed by the angle-of-view control unit A1012 using information based on the calculation result of the magnification ratio for image capturing by the magnification ratio control unit C1016.

The magnification ratio control unit C1016 outputs information about the magnification ratio for image capturing to the angle-of-view determination unit A1011.

Each functional configuration of the image capturing system C1000 according to the third exemplary embodiment has been described above by focusing in particular on the parts different from the image capturing system A1000 according to the first exemplary embodiment. The operation of each of the functional blocks other than those described above is substantially the same as that of the image capturing system A1000 according to the first exemplary embodiment, and thus the detailed redundant description thereof is omitted.

(Processing)

An example of processing to be performed by the image capturing system C1000 will be described with reference to FIG. 20. The image capturing system C1000 starts execution of a series of processing illustrated in FIG. 20 in accordance with, for example, a user's instruction received via a predetermined input apparatus.

In step S201, the video image acquisition unit A1003 acquires image data based on the image capturing result from the image capturing apparatus A1001.

In step S202, the human body extraction unit A1004 performs image processing on the image indicated by the image data acquired by the video image acquisition unit A1003, and extracts each human body captured in the image. The human body extraction unit A1004 outputs information based on the extraction result of each human body from the image to each of the association unit A1006 and the inter-human-body distance calculation unit C1015.

In step S203, the attention target extraction unit A1005 performs image processing on the image indicated by the image data acquired by the video image acquisition unit A1003, to extract a ball (a subject set as an attention target) captured in the image.

In step S204, the association unit A1006 associates the ball extracted from the image in step S202 with the human body extracted from the image in step S203. As a specific example, in a case where a human body at a distance of less than or equal to the threshold from the ball is extracted, the association unit A1006 associates the human body with the ball.

In step S205, the association unit A1006 determines whether the human body is associated with the ball. In a case where the association unit A1006 determines that the human body is not associated with the ball in step S205 (NO in step S205), the processing proceeds to step S216. Meanwhile, in a case where the association unit A1006 determines that the human body is associated with the ball in step S205 (YES in step S205), the association unit A1006 outputs the association information based on the result of associating the human body with the ball to each of the object information storing unit A1007 and the skeleton information estimation unit A1009. Then, the processing proceeds to step S206.

In step S206, the object information storing unit A1007 acquires the association information for each frame from the association unit A1006, and stores the association information. Further, in a case where the object information storing unit A1007 stores the association information for the latest frame and the association information for the frame immediately preceding the latest frame, the object information storing unit A1007 outputs the association information corresponding to these frames to the movement direction estimation unit A1008. Meanwhile, in a case where the object information storing unit A1007 does not store the association information corresponding to the frame immediately preceding the latest frame, the object information storing unit A1007 outputs the association information corresponding to the latest frame to the movement direction estimation unit A1008. Then, the processing proceeds to step S207.

In step S207, the movement direction estimation unit A1008 acquires, from the object information storing unit A1007, the association information for the latest frame and the association information for the frame immediately preceding the latest frame. The movement direction estimation unit A1008 estimates the movement direction of each of the human body and the ball based on the association information acquired for these frames, and outputs information based on the estimation result to the angle-of-view control unit A1012.

In step S209, the skeleton information estimation unit A1009 determines whether skeleton information about the human body is successfully estimated (has been estimated). In a case where the skeleton information estimation unit A1009 determines that the skeleton information about the human body is successfully estimated (has been estimated) in step S209 (YES in step S209), the skeleton information estimation unit A1009 outputs information based on the estimation result of the skeleton information about the human body to the state determination unit A1010. Further, the skeleton information estimation unit A1009 outputs information indicating that the skeleton information about the human body is successfully estimated (skeleton information about the human body has been estimated) to the angle-of-view determination unit A1011. Then, the processing proceeds to step S213.

Meanwhile, in a case where the skeleton information estimation unit A1009 determines that the skeleton information about the human body is not successfully estimated (has not been estimated) in step S209 (NO in step S209), the skeleton information estimation unit A1009 outputs information indicating that the skeleton information about the human body is not successfully estimated (information indicating that the skeleton information about the human body has not been estimated) to the angle-of-view determination unit A1011. Then, the processing proceeds to step S210.

In step S210, the inter-human-body distance calculation unit C1015 acquires, from the human body extraction unit A1004, information based on the extraction result of each human body from the image. In a case where the skeleton information estimation unit A1009 has not estimated (cannot successfully estimate) the skeleton information about the human body, the inter-human-body distance calculation unit C1015 acquires information indicating that the estimation has not been performed and association information based on the result of associating the ball and the human body extracted from the image.

In a case where the skeleton information estimation unit A1009 has not estimated the skeleton information about the human body, the inter-human-body distance calculation unit C1015 calculates a distance between the human body associated with the ball and each of human bodies other than the human body, based on the association information and the extraction result of the human body from the image. The inter-human-body distance calculation unit C1015 creates a list of other human bodies (inter-human-body distance list) in an ascending order of distance from the human body associated with the ball, and outputs the inter-human-body distance list and coordinate information about each human body coordinate information to the magnification ratio control unit C1016.

In step S211, the magnification ratio control unit C1016 acquires the inter-human-body distance list and coordinate information about each human body from the inter-human-body distance calculation unit C1015. The magnification ratio control unit C1016 determines the magnification ratio for image capturing in a manner such that a predetermined number of human bodies is captured within the angle of view centered on the human body associated with the ball, based on the acquired inter-human-body distance list and coordinate information about each human body. The magnification ratio control unit C1016 outputs information about the magnification ratio for image capturing to the angle-of-view determination unit A1011.

In step S212, the angle-of-view determination unit A1011 acquires information about the magnification ratio for image capturing from the magnification ratio control unit C1016, and transfers the information to the angle-of-view control unit A1012. The angle-of-view control unit A1012 controls the magnitude of the angle of view by performing the zoom control operation based on the information about the magnification ratio for image capturing acquired from the magnification ratio control unit C1016 via the angle-of-view determination unit A1011. As described above, the angle-of-view control unit A1012 controls the magnitude of the angle of view in a manner such that the predetermined number of human bodies, including the human body associated with the ball, is captured within the angle of view. Then, the processing proceeds to step S208. In this case, in step S208, the skeleton information estimation unit A1009 estimates the skeleton information about the human body again based on the image obtained after the zoom control operation is performed by the angle-of-view control unit A1012.

In step S213, the state determination unit A1010 acquires the estimation result of the skeleton information about the human body from the skeleton information estimation unit A1009, and determines a state (e.g., a motion state) of the human body based on the estimation result of the skeleton information about the human body. Further, the state determination unit A1010 determines a state (e.g., a movement state) of the ball based on the determination result of the state of the human body. The state determination unit A1010 estimates the movement amount of the ball based on the determination result of the state of the ball. The state determination unit A1010 outputs information based on the determination result of the state of each of the human body and the ball (e.g., information based on the estimation result of the movement amount of the ball) to the angle-of-view determination unit A1011.

In step S214, the angle-of-view determination unit A1011 acquires information based on the determination result of the state of each of the human body and the ball (e.g., information based on the estimation result of the movement amount of the ball) from the state determination unit A1010. The angle-of-view determination unit A1011 determines whether the estimation result of the movement amount of the ball (estimated movement amount of the ball) is greater than the threshold, based on the information based on the determination result of the state of each of the human body and the ball.

In a case where the angle-of-view determination unit A1011 determines that the estimated movement amount of the ball is greater than the threshold in step S214 (YES in step S214), the angle-of-view determination unit A1011 determines the magnification ratio for image capturing in accordance with the estimated movement amount of the ball, and outputs information about the magnification ratio to the angle-of-view control unit A1012. As a specific example, in a case where the estimated movement amount of the ball is greater than the threshold, the angle-of-view determination unit A1011 determines that the zoom-out control operation is to be performed, and determines the magnification ratio for the zoom-out control operation, and then outputs information about the magnification ratio to the angle-of-view control unit A1012. Then, the processing proceeds to step S215.

Meanwhile, in a case where the angle-of-view determination unit A1011 determines that the estimated movement amount of the ball is less than or equal to the threshold in step S214 (NO in step S214), the processing proceeds to step S216. In this case, the processing of step S215 is skipped.

In step S215, the angle-of-view control unit A1012 acquires the information about the magnification ratio for image capturing from the angle-of-view determination unit A1011, and performs the zoom control operation based on the magnification ratio.

In step S216, the angle-of-view control unit A1012 acquires information based on the estimation result of the movement direction of each of the human body and the ball from the movement direction estimation unit A1008. The angle-of-view control unit A1012 performs a control operation for controlling the direction of the angle of view, such as pan control and tilt control, based on the acquired information. Meanwhile, in a case where the above-described information is not output from the movement direction estimation unit A1008 (e.g., in a case where the movement direction estimation unit A1008 has not detected any movement of the human body), the angle-of-view control unit A1012 may control the angle of view to set an image capturing direction to the same direction previously set. As described above, the angle-of-view control unit A1012 controls the angle of view and outputs the image data indicating the image obtained after the angle of view is controlled to the output control unit A1013.

In step S217, the output control unit A1013 acquires the image data from the angle-of-view control unit A1012, and causes the output apparatus A1014 to output the image indicated by the image data. The output apparatus A1014 displays the image based on the image data described above on the screen in accordance with an instruction from the output control unit A1013, whereby the image is presented to the user.

Figure 20:
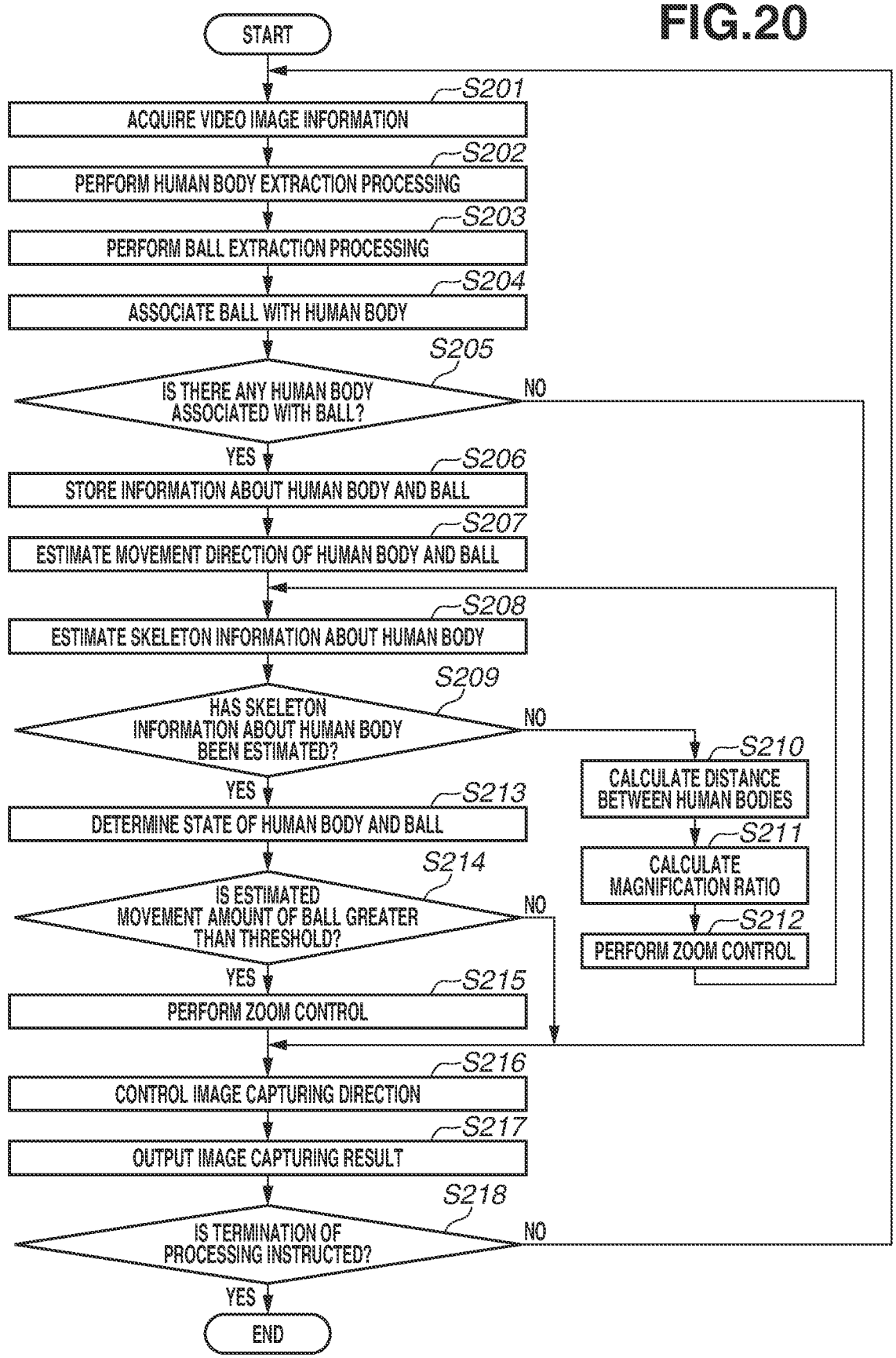
FIG. 20 is a flowchart illustrating an example of processing that is performed by the image capturing system.

In step S218, the angle-of-view control apparatus A1002 determines whether termination of the series of processing illustrated in FIG. 20 is instructed. As a specific example, the angle-of-view control apparatus A1002 may determine whether termination of the series of processing illustrated in FIG. 20 is instructed, based on whether an input unit (e.g., an on/offswitch), which is not illustrated in FIG. 17, has received an instruction to interrupt image capturing processing from the user.

In a case where the angle-of-view control apparatus A1002 determines that termination of the series of processing is not instructed in step S218 (NO in step S218), the processing returns to step S201 to execute the series of processing illustrated in FIG. 20 again from step S201.

Meanwhile, in a case where the angle-of-view control apparatus A1002 determines that termination of the series of processing is instructed in step S218 (YES in step S218), the series of processing illustrated in FIG. 20 is terminated.

By the above-described control operation, even when the movement or speed of the ball is rapidly changed, the movement of the ball can be estimated by analyzing the motion state of the human body associated with the ball, and the angle of view can be controlled using the estimation result. In addition, in a case where it is difficult to estimate skeleton information about each human body based on the captured image, the magnitude of the angle of view is controlled in a manner such that an image of the human body is enlarged to the extent that a predetermined number of human bodies is captured within the angle of view. Therefore, it is possible to accurately analyze the operating state of each human body, and thus it is possible to accurately estimate the movement of the ball.

Other Exemplary Embodiments

The present disclosure can also be implemented by processing in which programs for implementing one or more functions of the exemplary embodiments described above are supplied to a system or an apparatus via a network or a storage medium, and one or more processors in a computer of the system or the apparatus read out programs and execute the programs. The present disclosure can also be implemented by a circuit (e.g., an ASIC) for implementing one or more functions.

Each functional configuration illustrated in FIG. 1 is merely an example, and each functional configuration of the image capturing system A1000 is not necessarily limited as long as each functional configuration illustrated in FIG. 1 can be implemented. For example, each functional configuration of the angle-of-view control apparatus A1002 may be implemented by a plurality of apparatuses that operate in cooperation. As a specific example, a processing load associated with execution of processing for at least some of the functional configurations of the angle-of-view control apparatus A1002 may be distributed to a plurality of apparatuses. In another example, functional configurations corresponding to some of the functional configurations of the angle-of-view control apparatus A1002 may be provided in another apparatus. As a specific example, the functional configurations corresponding to the human body extraction unit A1004 and the attention target extraction unit A1005 may be provided in another apparatus.

Figure 13:
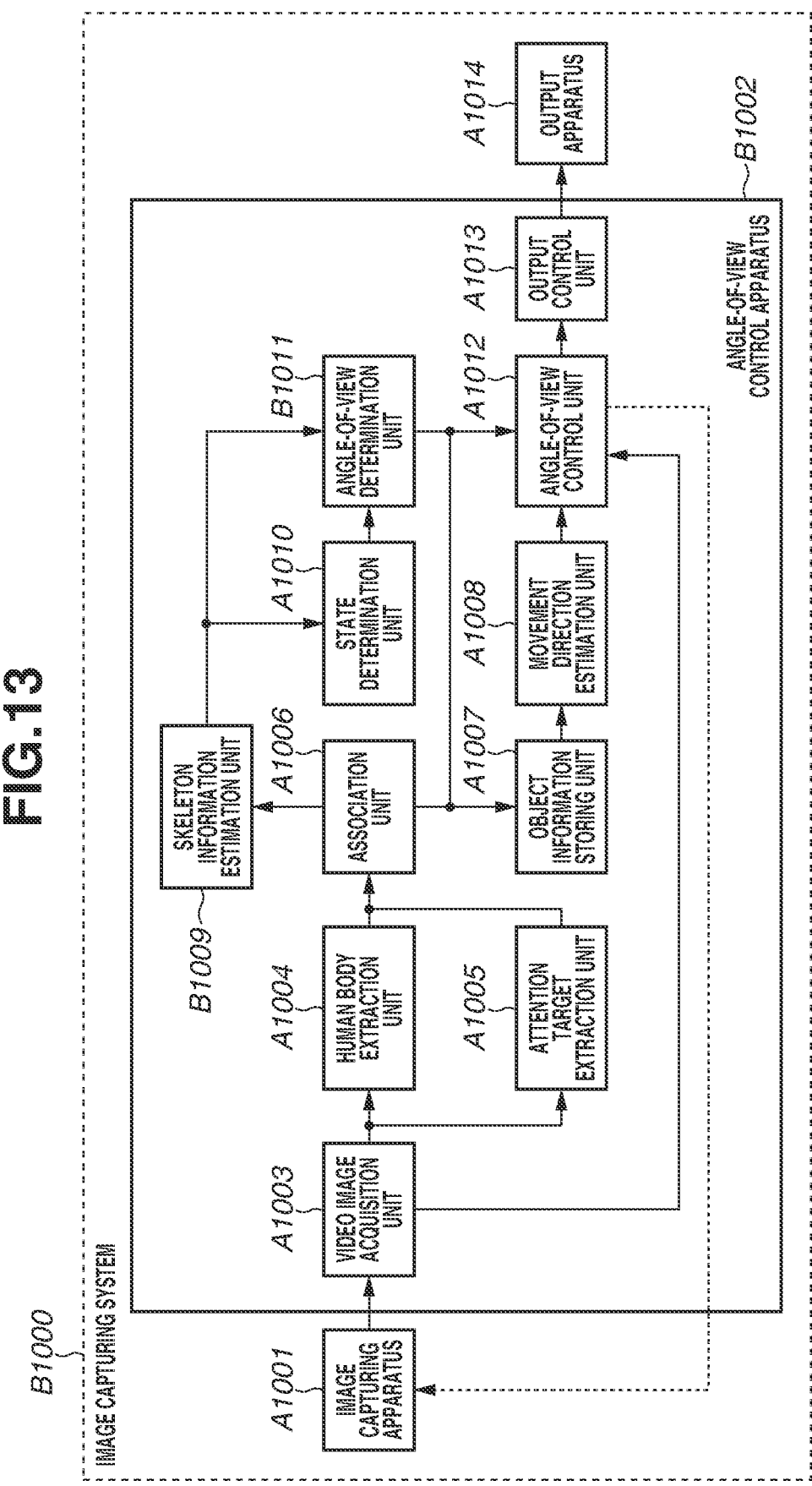
FIG. 13 is a block diagram illustrating an example of each functional configuration of an image capturing system.
Figure 17:
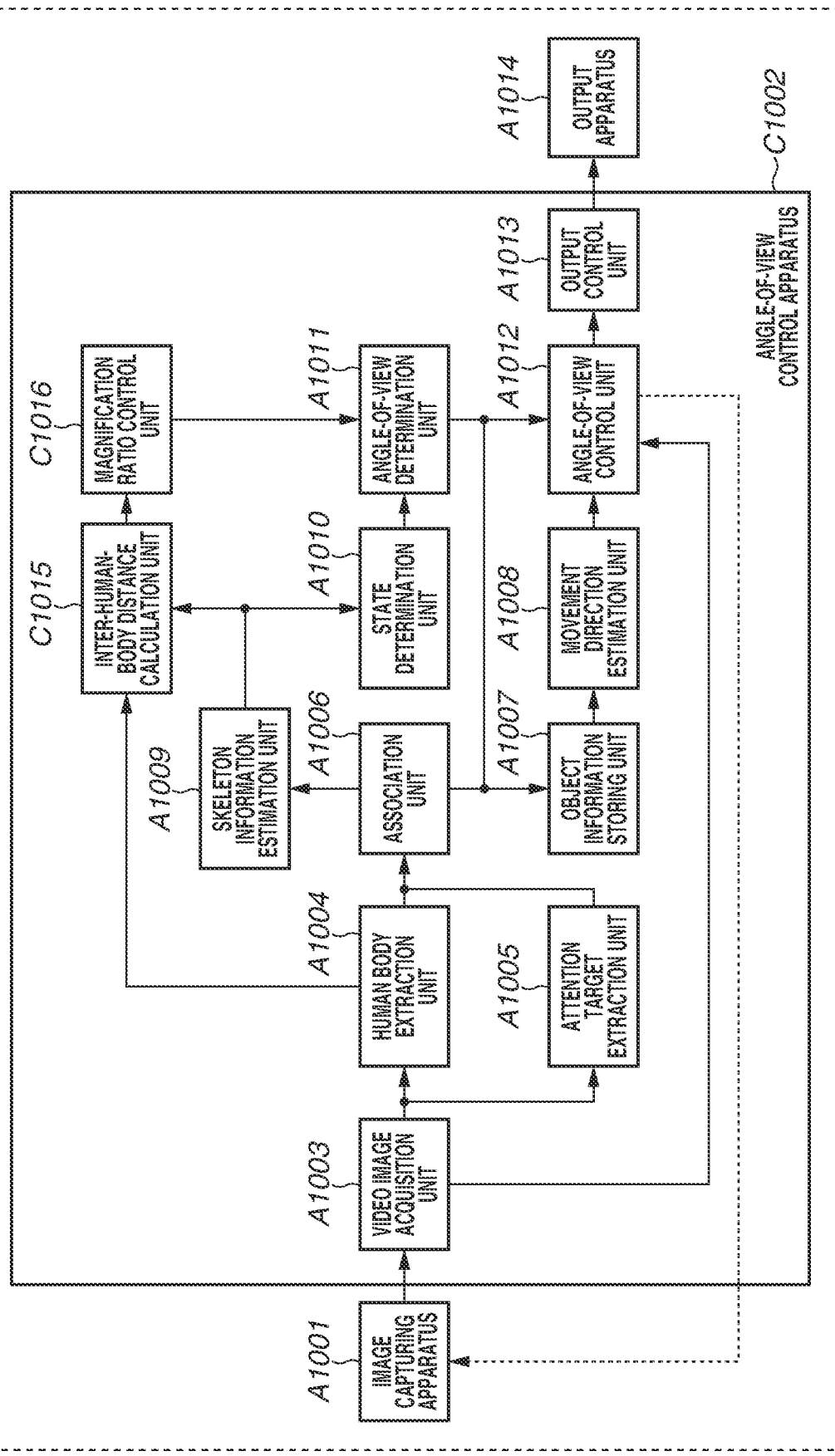
FIG. 17 is a block diagram illustrating an example of functional configuration of an image capturing system.

The above-described configuration is applicable not only to the image capturing system A1000 illustrated in FIG. 1, but also to the image capturing system B1000 illustrated in FIG. 13 and the image capturing system C1000 illustrated in FIG. 17.

The hardware configuration illustrated in FIG. 11 is merely an example, and thus it is not intended to limit the hardware configuration of the information processing apparatus 200 for implementing the angle-of-view control apparatuses A1002, B1002, and C1002. For example, some of the components of the information processing apparatus 200 illustrated in FIG. 11 may be externally provided to the information processing apparatus 200 as an external apparatus. As a specific example, the components corresponding to the display unit 215 and the operation unit 216 may be externally provided to the information processing apparatus 200.

In each of the exemplary embodiments described above, the angle-of-view control unit estimates skeleton information (in other words, a positional relationship between regions) mainly for a human body captured in an image, and the motion of the human body is estimated based on the skeleton information. Based on this configuration, the angle-of-view control unit uses the estimation result of the motion of the human body to control the direction of the angle of view and the magnitude of the angle of view in a manner such that a subject set as an attention target is captured within the angle of view.

Meanwhile, the subject whose motion is to be estimated is not limited to a human body, as long as the motion of a subject including a plurality of regions can be estimated based on the positional relationship among the plurality of regions of the subject. As a specific example, the motion of a predetermined animal can be estimated by estimating skeleton information about the animal. Also, in the case of estimating the motion of an articulated body, in a case where a movable range of each of joints included in the articulated body is known, the motion of the articulated body can be estimated based on an idea similar to that described above.

In addition, the subject set as the attention target is not necessarily limited to a ball. In other words, an object to be set as the first subject is not particularly limited as long as the motion of the first subject can be estimated by estimating the motion of the second subject different from the first subject set as the attention target (image capturing target).

According to the exemplary embodiments described above, it is possible to capture a subject within an angle of view in a suitable mode even in a case where the motion of the subject varies.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-184555, filed Oct. 7, 2019, which is hereby incorporated by reference herein in its entirety.

What is claimed is:

1. A control apparatus comprising:
at least one processor which causes the control apparatus to act as:
an extraction unit configured to extract a first subject and a second subject from an image captured by an image capturing apparatus;
an estimation unit configured to estimate a skeleton of the second subject extracted by the extraction unit and estimate an amount of a future movement of the first subject based on the estimated skeleton of the second subject; and
a control unit configured to determine, when the amount of the future movement of the first subject estimated by the estimation unit is equal to or greater than a threshold, a magnification ratio zooming out an angle of view of the image capturing apparatus, based on the amount of the future movement, and to zoom out the angle of view according to the determined ratio;
wherein the second subject is a human body, and
wherein the estimation unit is configured to estimate an angle formed between both legs of the estimated skeleton and to estimate the amount of the future movement of the first subject based on the angle formed between both legs of the estimated skeleton.

2. The control apparatus according to claim 1, wherein the estimation unit identifies a centroid position of the second subject based on the skeleton of the second subject and estimates the amount of the future movement of the first subject based on the centroid position.

3. The control apparatus according to claim 1, wherein the estimation unit identifies an orientation of the second subject based on the skeleton of the second subject and estimates the amount of the future movement of the first subject based on the orientation.

4. The control apparatus according to claim 1, wherein the at least one processor causes the control apparatus to act as an association unit configured to associate the first subject set as an image capturing target with the second subject, the second subject being captured in the image and being different from the first subject.

5. The control apparatus according to claim 1, wherein the estimation unit estimates a motion of the second subject after the image is captured, based on the skeleton of the second subject, and estimates the amount of the future movement of the first subject after the image is captured, based on the estimated motion of the second subject.

6. The control apparatus according to claim 1, wherein the first subject is a ball.

7. The control apparatus according to claim 1,
wherein the estimation unit estimates a direction of the future movement of the first subject; and
wherein the control unit controls to move the zoomed out angle of view in the estimated direction by panning or tilting the image capturing apparatus.

8. The control apparatus according to claim 1, wherein the control unit controls to zoom in the zoomed out angle of view such that the first subject is captured within the angle of view of the image capturing apparatus, when a distance between the first subject and the second subject is less than a predetermined threshold.

9. The control apparatus according to claim 4, wherein the association unit associates the second subject with the first subject, depending on a distance between the first subject and the second subject.

10. The control apparatus according to claim 5, wherein the control unit controls at least one of a direction and a magnitude of the angle of view in a manner such that the first subject is captured within the angle of view.

11. The control apparatus according to claim 5,
wherein the control unit controls the magnification ratio of the image capturing apparatus in a manner such that the skeleton of the second subject is captured within an angle of view of the image capturing apparatus and an enlarged image of the second subject is captured,
wherein the extraction unit extracts the second subject from the image obtained by capturing an enlarged image of the second subject, and
wherein the estimation unit estimates the motion of the second subject extracted by the extraction unit.

12. The control apparatus according to claim 9, wherein the association unit associates the second subject with the first subject, the second subject being at a shortest distance away from the first subject.

13. The control apparatus according to claim 11, wherein the control unit controls the magnification ratio of the image capturing apparatus in a manner such that a predetermined number of the second subjects are captured within the angle of view of the image capturing apparatus, the predetermined number of the second subjects being subjects at a shorter distance away from the first subject than others.

14. A control system comprising:
at least one processor which causes the control system to act as:
an extraction unit configured to extract a first subject and a second subject from an image captured by an image capturing apparatus;
an estimation unit configured to estimate a skeleton of the second subject extracted by the extraction unit and estimate an amount of a future movement of the first subject based on the estimated skeleton of the second subject; and
a control unit configured to determine, when the amount of the future movement of the first subject estimated by the estimation unit is equal to or greater than a threshold, an angle of view of the image capturing apparatus, based on the amount of the future movement, and to zoom out the angle of view according to the determined magnification ratio;
wherein the second subject is a human body, and wherein the estimation unit is configured to estimate an angle formed between both legs of the estimated skeleton and to estimate the amount of the future movement of the first subject based on the angle formed between both legs of the estimated skeleton.

15. The control system according to claim 14, further comprising the image capturing apparatus.

16. A control method that is executed by a control apparatus, the control method comprising:

extracting a first subject and a second subject from an image captured by an image capturing apparatus;

estimating a skeleton of the second subject extracted and estimating an amount of a future movement of the first subject based on the estimated skeleton of the second subject; and determining, when the amount of the future movement of the first subject estimated is equal to or greater than a threshold, a magnification ratio for zooming out an angle of view of the image capturing apparatus, based on the amount of the future movement, and to zoom out the angle of view according to the determined magnification ratio, wherein the second subject is a human body, and wherein the estimation unit is configured to estimate an angle formed between both legs of the estimated skeleton and to estimate the amount of the future movement of the first subject based on the angle formed between both legs of the estimated skeleton.

17. A computer-readable non-transitory storage medium storing a program for executing a control method comprising:

extracting a first subject and a second subject from an image captured by an image capturing apparatus;

estimating a skeleton of the second subject extracted and estimating an amount of a future movement of the first subject based on the estimated skeleton of the second subject; and determining, when the amount of the future movement of the first subject estimated is equal to or greater than a threshold, a magnification ratio for zooming out an angle of view of the image capturing apparatus, based on the amount of the future movement, and to zoom out the angle of view according to the determined magnification ratio, wherein the second subject is a human body, and wherein the estimation unit is configured to estimate an angle formed between both legs of the estimated skeleton and to estimate the amount of the future movement of the first subject based on the angle formed between both legs of the estimated skeleton.

* * * * *